United States Patent
Kimura

(10) Patent No.: US 11,960,326 B2
(45) Date of Patent: Apr. 16, 2024

(54) CONTROL METHOD, PROGRAM, AND DISPLAY DEVICE FOR REPRODUCING A MOVING IMAGE ON FOLDABLE DISPLAY

(71) Applicant: LINE CORPORATION, Tokyo (JP)

(72) Inventor: Kazutaka Kimura, Tokyo (JP)

(73) Assignee: LINE CORPORATION, Tokyo (JP)

( * ) Notice: Subject to any disclaimer, the term of this patent is extended or adjusted under 35 U.S.C. 154(b) by 425 days.

(21) Appl. No.: 17/358,753

(22) Filed: Jun. 25, 2021

(65) Prior Publication Data
US 2021/0318728 A1 Oct. 14, 2021

Related U.S. Application Data

(63) Continuation of application No. PCT/JP2018/047921, filed on Dec. 26, 2018.

(30) Foreign Application Priority Data

Dec. 26, 2018 (JP) .................. 2018-242042

(51) Int. Cl.
*G06F 1/16* (2006.01)
*G06F 3/0484* (2022.01)
*G06F 3/04886* (2022.01)

(52) U.S. Cl.
CPC .......... *G06F 1/1677* (2013.01); *G06F 1/1616* (2013.01); *G06F 3/0484* (2013.01); *G06F 3/04886* (2013.01)

(58) Field of Classification Search
CPC ........ G06F 1/1677; G06F 1/1616; G06F 3/01; G06F 3/0481; G06F 3/0484;
(Continued)

(56) References Cited

U.S. PATENT DOCUMENTS

2010/0064244 A1* 3/2010 Kilpatrick, II ...... H04M 1/0243
345/1.3
2010/0153544 A1* 6/2010 Krassner ............... G06F 40/143
709/224
(Continued)

FOREIGN PATENT DOCUMENTS

JP 2012-502321 A 1/2012
JP 2015-060457 A 3/2015
(Continued)

OTHER PUBLICATIONS

Scott Taylor, "Pythagoras in the hyperbolic plane", Mar. 28, 2014, The Geometric Viewpoint, retrieved from <https://web.colby.edu/thegeometricviewpoint/category/pythagorean-theorem/>, retrieved on Jan. 22, 2024, pp. 1-5 (Year: 2014).*

(Continued)

*Primary Examiner* — Nicholas Klicos
(74) *Attorney, Agent, or Firm* — Sughrue Mion, PLLC

(57) ABSTRACT

A moving image control method for controlling display of a moving image on a foldable display device is provided. The moving image control method includes: acquiring moving image position information indicating a position in a display region at which the moving image is displayed; acquiring fold state information indicating a fold state of the foldable display device; and controlling whether the moving image is stopped or reproduced in the display region based on the moving image position information and the fold state information.

15 Claims, 18 Drawing Sheets

(58) Field of Classification Search
CPC .. G06F 3/0485; G06F 3/0487; G06F 3/04886; G06F 3/1423; G06F 19/00; G06F 2203/04803; G09G 2320/0261; G09G 2320/028; G09G 2340/04; G09G 2340/0464; G09G 5/14; G09G 5/38; G09G 5/003
See application file for complete search history.

(56) References Cited

U.S. PATENT DOCUMENTS

| | | | | |
|---|---|---|---|---|
| 2010/0182265 | A1* | 7/2010 | Kim | G06F 1/1641 345/1.3 |
| 2013/0154971 | A1* | 6/2013 | Kang | G06F 1/1652 345/173 |
| 2014/0015743 | A1* | 1/2014 | Seo | G06F 3/017 345/156 |
| 2015/0082339 | A1 | 3/2015 | Sumitomo et al. | |
| 2016/0034047 | A1* | 2/2016 | Lee | H04M 1/72427 345/156 |
| 2016/0259514 | A1* | 9/2016 | Sang | G06F 3/0487 |
| 2018/0246628 | A1 | 8/2018 | Sang et al. | |
| 2020/0004297 | A1* | 1/2020 | Rekapalli | G06F 1/1618 |
| 2020/0177967 | A1* | 6/2020 | Rakshit | H04N 21/4852 |

FOREIGN PATENT DOCUMENTS

| | | |
|---|---|---|
| JP | 2016-162447 A | 9/2016 |
| KR | 10-2012-0070190 A | 6/2012 |
| KR | 10-2016-0108705 A | 9/2016 |
| KR | 10-2017-0079547 A | 7/2017 |
| WO | 2010/028402 A1 | 3/2010 | m

OTHER PUBLICATIONS

English translation of Written Opinion dated Apr. 2, 2019 issued by the International Searching Authority in International Application No. PCT/JP2018/047921.

Written Opinion dated Apr. 2, 2019 by the International Searching Authority in International Application PCT/JP2018/047921.

International Search Report dated Apr. 2, 2019 by the International Searching Authority in International Application PCT/JP2018/047921.

Office Action dated Aug. 7, 2023 in Korean Application No. 10-2021-7018873.

* cited by examiner

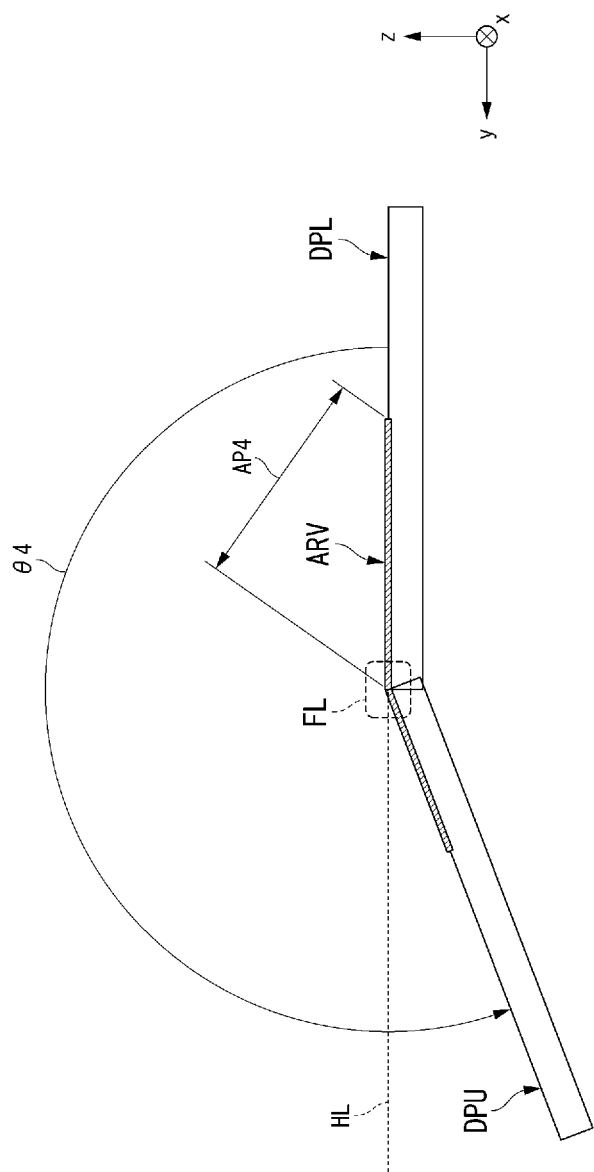

CONTROL METHOD, PROGRAM, AND DISPLAY DEVICE FOR REPRODUCING A MOVING IMAGE ON FOLDABLE DISPLAY

CROSS-REFERENCE TO RELATED APPLICATIONS

This application is a continuation of International Application No. PCT/JP2018/047921 filed on Dec. 26, 2018, which claims priority from Japanese Patent Application No. 2018-242042, filed on Dec. 26, 2018, in the Japanese Patent Office, the disclosures of which are incorporated herein by reference in their entireties.

TECHNICAL FIELD

The present disclosure relates to a display control method, a program, and a display device.

BACKGROUND ART

In recent years, research has been conducted regarding foldable multi-panel devices that include a plurality of display surfaces. For example, research has been conducted regarding a multi-panel device that includes a plurality of display surfaces coupled by a hinge. However, there is a need for improved display in multi-panel devices.

SUMMARY

According to an aspect of an embodiment, a moving image control method for controlling display of a moving image on a foldable display device includes: acquiring moving image position information indicating a position in a display region at which the moving image is displayed; acquiring fold state information indicating a fold state of the foldable display device; and controlling whether the moving image is stopped or reproduced in the display region based on the moving image position information and the fold state information.

The controlling may be performed based on an apparent size of the moving image that varies as the foldable display device is folded.

The moving image may be stopped based on the apparent size of the moving image being less than or equal to a set size.

The apparent size of the moving image may vary based on the position in the display region at which the moving image is displayed.

The apparent size of the moving image may change based on the position in the display region at which the moving image is displayed based on the display region being folded.

The apparent size of the moving image may be based on a display area of the moving image in the display region.

The fold state information may indicate a fold angle of the foldable display device, and the controlling whether the moving image is stopped or reproduced may be based on the fold angle.

The moving image control method may further include performing control to stop the moving image based on the fold angle being less than or equal to a first angle.

The moving image control method may further include performing control to reproduce the moving image based on the fold angle changing from less than or equal to the first angle to at least a second angle that is greater than the first angle.

The moving image control method may further include ending display of the moving image based on the fold angle being less than or equal to a third angle that is smaller than the first angle.

The controlling whether the moving image is stopped or reproduced may be controlled based on a positional relationship between the position in the display region at which the moving image is displayed and a user of the foldable display device.

The controlling whether the moving image is stopped or reproduced may be based on a direction of a line of sight of a user of the foldable display device or a positional relationship between the foldable display device and the user.

The controlling whether the moving image is stopped or reproduced may be based on an orientation of the foldable display device.

The moving image control method may further include displaying a user interface element that relates to the moving image at a position that is different from a folded position of the display region.

The moving image control method may further include continuously displaying a frame image among a plurality of frame images that constitute the moving image while the moving image is stopped.

According to an aspect of an embodiment, a non-transitory computer readable storage medium stores program instructions that are to be executed by a computer of a foldable display device to perform a moving image control method for controlling display of a moving image on the foldable display device, the moving image control method including: acquiring moving image position information indicating a position in a display region at which the moving image is displayed; acquiring fold state information indicating a fold state of the foldable display device; and controlling whether the moving image is stopped or reproduced in the display region based on the moving image position information and the fold state information.

According to an aspect of an embodiment, a display device includes: a foldable display panel; a memory configured to store computer-readable instructions; and a processor configured to execute the computer-readable instructions to: acquire moving image position information and fold state information, the moving image position information indicating a position in a display region at which a moving image is displayed on the foldable display panel, and the fold state information indicating a fold state of the foldable display device; and control whether the moving image is stopped or reproduced in the display region based on the moving image position information and the fold state information.

BRIEF DESCRIPTION OF DRAWINGS

The above and other aspects, features, and advantages of certain embodiments of the present disclosure will be more apparent from the following description taken in conjunction with the accompanying drawings, in which:

FIG. 9 is a diagram showing an example of the apparent size for a terminal of the present embodiment whose fold angle can exceed 180 degrees.

DETAILED DESCRIPTION

Embodiments for implementing a display control method, a program, and a display device according to the present disclosure will be described with reference to the drawings.

System Configuration

Figure 1:
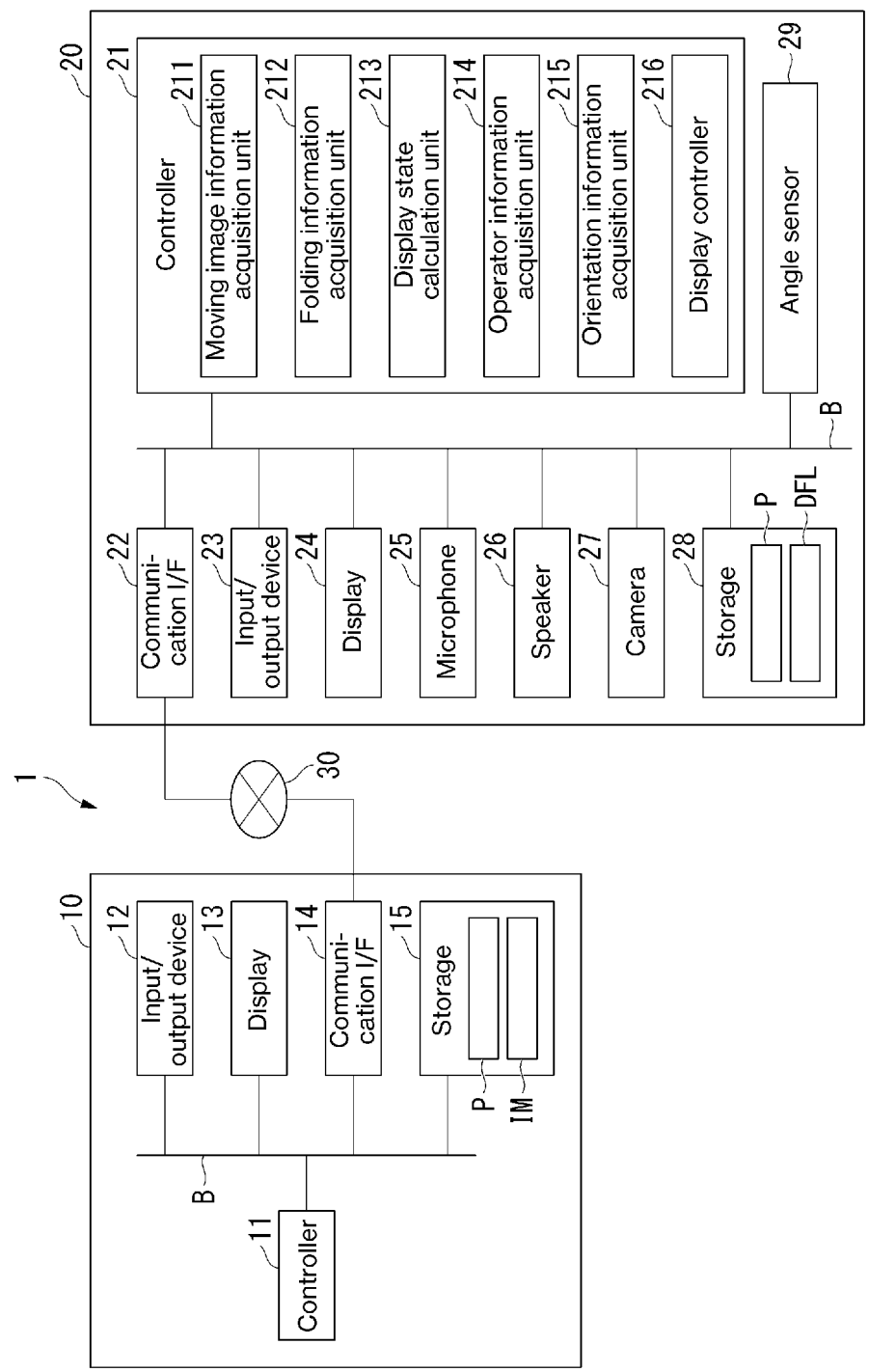
FIG. 1 is a diagram showing a configuration of a communication system in an aspect of an embodiment.
Figure 2:
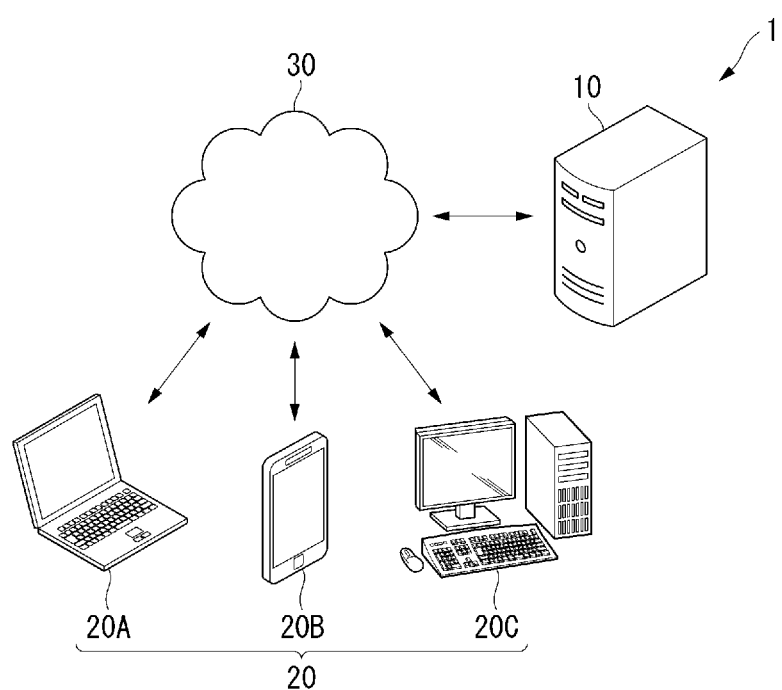
FIG. 2 is a diagram showing an overview of the configuration of the communication system in an aspect of an embodiment.

FIG. 1 shows a configuration of a communication system 1 according to an embodiment of the present disclosure. FIG. 2 shows an overview of the configuration of the communication system 1 according to an embodiment of the present disclosure. As shown in FIG. 1 and FIG. 2, in the communication system 1, a server 10 and terminals 20 (terminals 20A, 20B, and 20C) are connected to each other via a network 30. The server 10 provides, via the network 30 to the terminals 20 used by respective users, a service for enabling the terminals 20 to exchange messages with each other. Note that various numbers of terminals 20 may be connected to the network 30.

The network 30 serves to connect one or more terminals 20 and one or more servers 10 to each other. That is, the network 30 serves as a communication network that provides a connection path to enable the terminals 20 and the servers 10 to transmit and receive data after the terminals 20 and the servers 10 are connected to the network 30.

One or more portions of the network 30 may optionally be a wired network or a wireless network. Non-limiting examples of the network 30 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a mobile phone network, integrated service digital networks (ISDNs), a radio LAN, long term evolution (LTE), code division multiple access (CDMA), Bluetooth (registered trademark), satellite communication, and a combination of two or more of these networks. The network 30 may be constituted by a single network 30 or a plurality of networks 30.

Each of the terminals 20 (terminals 20A, 20B, and 20C) may be an information processing terminal that is capable of implementing functions described in embodiments. Non-limiting examples of the terminals 20 include a smartphone, a mobile phone (a feature phone), a computer (non-limiting examples of which include a desktop, a laptop, and a tablet), a media computer platform (non-limiting examples of which include cable and satellite set-top boxes and a digital video recorder), a handheld computer device (non-limiting examples of which include a personal digital assistant (PDA) and an electronic mail client), a wearable terminal (an eyeglasses-type device, a watch-type device, etc.), and other types of computers and communication platforms. The terminals 20 may also be referred to as "information processing terminals".

Configurations of the terminals 20A, 20B, and 20C are basically the same as each other, and accordingly, the following describes a terminal 20. Also, a terminal that is used by a user X will be referred to as a "terminal 20X", and user information that is associated with the user X or the terminal 20X in a predetermined service will be referred to as "user information X", as necessary. The user information is information regarding a user associated with an account associated with the user in the predetermined service. Non-limiting examples of the user information include information that is input by the user or is assigned by the predetermined service, and is associated with the user, such as user's name, an icon image of the user, user's age, user's gender, user's address, user's hobbies/preferences, and user's identifier, and the user information may optionally be any one of or a combination of two or more of these pieces of information.

The server 10 may provide a predetermined service to the terminal 20. The server 10 may be any information processing device that is capable of implementing functions described in embodiments. Non-limiting examples of the server 10 include a server device, a computer (non-limiting examples of which include a desktop, a laptop, and a tablet), a media computer platform (non-limiting examples of which include cable and satellite set-top boxes and a digital video recorder), a handheld computer device (non-limiting examples of which include a PDA and an electronic mail client), and other types of computers and communication platforms. The server 10 may also be referred to as an "information processing device". If there is no need to distinguish the server 10 and the terminal 20, each of the server 10 and the terminal 20 may optionally be referred to as an "information processing device".

Hardware (HW) Configurations

HW configurations of the devices included in the communication system 1 will be described using FIG. 1.
(1) HW Configuration of Terminal The terminal 20 includes a controller 21 (central processing unit: CPU), a storage 28, a communication interface (I/F) 22, an input/output device 23, a display 24, a microphone 25, a speaker 26, and a camera 27. The HW constituent elements of the terminal 20 are connected to each other via a bus B, for example, without limitation thereto. Note that the terminal 20 does not necessarily have to include all of the constituent elements. The terminal 20 may optionally be configured such that one or more constituent elements such as the microphone 25 and the camera 27 are removable.

The communication I/F 22 transmits and receives various types of data via the network 30. The communication may be carried out in a wired or wireless manner, and may be based on any communication protocol that enables mutual communication to be carried out. The communication I/F 22 may communicate with the server 10 via the network 30. The communication I/F 22 transmits various types of data to the server 10 in accordance with instructions from the controller 21. Also, the communication I/F 22 receives various types of data transmitted from the server 10 and conveys the data to the controller 21. The communication I/F 22 may also be simply referred to as a "communication device". The communication I/F 22 may also be referred to as a "communication circuit" in a case where the communication I/F is constituted by a physically structured circuit.

The input/output device 23 includes a device that inputs various operations made to the terminal 20 and a device that outputs a result of processing performed by the terminal 20. The input/output device 23 may optionally be constituted by an input device and an output device that are configured as a single device or are separate from each other.

The input device is implemented by any one of or a combination of two or more of all types of devices capable of accepting input from a user and conveying information regarding the input to the controller 21. Non-limiting examples of the input device include a touch panel, a touch display, hardware keys of a keyboard or the like, a pointing device such as a mouse, a camera (input of operations via moving images), and a microphone (input of operations using voice).

The output device is implemented by any one of or a combination of two or more of all types of devices capable of outputting a result of processing performed by the controller 21. Non-limiting examples of the output device include a touch panel, a touch display, a speaker (audio output), a lens (non-limiting examples of which include 3D (three-dimensional) output and hologram output), and a printer.

The display 24 is implemented by any one of or a combination of two or more of all types of devices capable of providing display in accordance with display data written in a frame buffer. Non-limiting examples of the display 24 include a touch panel, a touch display, a monitor (non-limiting examples of which include a liquid crystal display (LCD) and an organic electroluminescence display (OELD)), a head mounted display (HMD), and devices capable of displaying images, text information, and the like using projection mapping or holograms, or in the air (may optionally be a vacuum). Note that the display 24 may optionally be capable of displaying display data in 3D.

If the input/output device 23 is a touch panel, the input/output device 23 and the display 24 may also have substantially the same size and shape and be arranged opposing each other.

The controller 21 includes a physically structured circuit for executing functions that are implemented in accordance with codes or commands included in a program, and is implemented by a data processing device embedded in hardware, for example, without limitation thereto. Accordingly, the controller 21 may optionally be referred to as a "control circuit".

Non-limiting examples of the controller 21 include a central processing unit (CPU), a microprocessor, a processor core, a multiprocessor, an Application-Specific Integrated Circuit (ASIC), and a Field Programmable Gate Array (FPGA).

The storage 28 may store various programs and various types of data that are necessary for the terminal 20 to operate. Non-limiting examples of the storage 28 include various storage media such as a Hard Disk Drive (HDD), a Solid State Drive (SSD), a flash memory, a Random Access Memory (RAM), and a Read Only Memory (ROM). The storage 28 may optionally be referred to as a "memory".

The terminal 20 stores a program P in the storage 28, and the controller 21 executes the program P to execute processing while serving as units that are included in the controller 21. That is, the program P stored in the storage 28 causes the terminal 20 to implement functions executed by the controller 21. The program P may optionally be referred to as a "program module".

The microphone 25 is used to input audio data. The speaker 26 is used to output audio data. The camera 27 is used to acquire moving image data.
(2) HW Configuration of Server The server 10 includes a controller (CPU) 11, a storage 15, a communication I/F 14, an input/output device 12, and a display 13. The HW constituent elements of the server 10 are connected to each other via a bus B, for example, without limitation thereto. Note that the HW configuration of the server 10 does not necessarily have to include all of the constituent elements. HW of the server 10 may optionally be configured such that the display 13 is removable.

The controller 11 includes a physically structured circuit for executing functions that are implemented in accordance with codes or commands included in a program, and is implemented by a data processing device embedded in hardware, for example, without limitation thereto.

The controller 11 is typically a central processing unit (CPU), and may optionally be a microprocessor, a processor core, a multiprocessor, an ASIC, or a FPGA. In the present disclosure, the controller 11 is not limited to these examples.

The storage 15 may store various programs and various types of data that are necessary for the server 10 to operate. The storage 15 is implemented by various storage media such as an HDD, an SSD, and a flash memory. However, in the present disclosure, the storage 15 is not limited to these examples. The storage 15 may optionally be referred to as a "memory".

The communication I/F 14 transmits and receives various types of data via the network 30. The communication may be carried out in a wired or wireless manner, and may be based on any communication protocol that enables mutual communication to be carried out. The communication I/F 14 may communicate with the terminal 20 via the network 30. The communication I/F 14 transmits various types of data to the terminal 20 in accordance with instructions from the controller 11. Also, the communication I/F 14 receives various types of data transmitted from the terminal 20 and conveys the data to the controller 11. The communication I/F 14 may also be simply referred to as a "communication device". The communication I/F 14 may also be referred to as a "communication circuit" in a case where the communication I/F is constituted by a physically structured circuit.

The input/output device 12 is implemented by a device that inputs various operations that are made to the server 10. The input/output device 12 is implemented by any one of or a combination of two or more of all types of devices capable of accepting input from a user and conveying information regarding the input to the controller 11. The input/output device 12 is implemented by hardware keys, a typical example of which is a keyboard, and a pointing device such as a mouse. Note that the input/output device 12 may optionally include a touch panel, a camera (input of operations via moving images), or a microphone (input of operations using voice). However, in the present disclosure, the input/output device 12 is not limited to these examples.

The display 13 is typically implemented by a monitor (non-limiting examples of which include an LCD and an OELD). Note that the display 13 may optionally be an HMD or the like. Note that the display 13 may optionally be capable of displaying display data in 3D. However, in the present disclosure, the display 13 is not limited to these examples.

The server 10 stores a program P in the storage 15, and the controller 11 executes the program P to execute processing while serving as units that are included in the controller 11. That is, the program P stored in the storage 15 causes the server 10 to implement functions executed by the controller 11. The program P may optionally be referred to as a "program module".

Embodiments of the present disclosure will be described assuming that the embodiments are implemented as a result of CPU(s) of the terminal 20 and/or the server 10 executing the program P.

Note that the controller 21 of the terminal 20 and/or the controller 11 of the server 10 may optionally implement processing by using not only the CPU(s) including a control circuit, but also a logic circuit (hardware) or a dedicated circuit that is formed on an integrated circuit an Integrated Circuit (IC) chip or a Large Scale Integration (LSI) chip or the like. Also, these circuits may optionally be implemented by one or more integrated circuits, and a plurality of types of processing described in the embodiments may optionally be implemented by a single integrated circuit. LSI may be referred to as VLSI, super LSI, ultra LSI, or the like depending on the degree of integration. Accordingly, the controller 21 may optionally be referred to as a "control circuit".

The program P (non-limiting examples of which include a software program, a computer program, and a program module) in the embodiments of the present disclosure may optionally be provided in a state where the program is stored in a computer-readable storage medium.

The program P can be stored in a "non-transitory tangible medium". Also, the program P may optionally be a program for implementing some of the functions described in the embodiments of the present disclosure. Furthermore, the program P may optionally be a differential file (differential program) that is configured to implement the functions described in the embodiments of the present disclosure in combination with a program P that is already recorded in a storage medium.

The storage medium may include one or more semiconductor-based or other integrated circuits (ICs, non-limiting examples of which include field programmable gate arrays (FPGAs) and application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM drives, secure digital cards, drives, any other appropriate storage media, and a suitable combination of two or more of these storage media. Where appropriate, the storage medium may consist only of a volatile storage medium or a non-volatile storage medium, or a combination of volatile and non-volatile storage media. Note that the storage medium is not limited to these examples, and may be any device or medium that is capable of storing the program P. Also, the storage medium may optionally be referred to as a "memory".

The server 10 and/or the terminal 20 can implement functions of a plurality of functional units described in the embodiments by reading the program P stored in the storage medium and executing the read program P.

The program P according to the present disclosure may optionally be provided to the server 10 and/or the terminal 20 via any transmission medium (a communication network, broadcast waves, etc.) that is capable of transmitting the program. The server 10 and/or the terminal 20 implement(s) the functions of the functional units described in the embodiments by executing the program P downloaded via the Internet or the like, for example, without limitation thereto.

The embodiments of the present disclosure can also be implemented in the form of a data signal that is embedded in carrier waves and in in which the program P is embodied through electronic transmission.

At least a portion of processing in the server 10 and/or the terminal 20 may optionally be implemented through cloud computing constituted by one or more computers.

At least a portion of processing in the terminal 20 may optionally be carried out by the server 10. In this case, the server 10 may optionally carry out at least a portion of processing carried out by functional units of the controller 21 of the terminal 20.

At least a portion of processing in the server 10 may optionally be carried out by the terminal 20. In this case, the terminal 20 may optionally carry out at least a portion of processing carried out by functional units of the controller 11 of the server 10.

In the embodiments of the present disclosure, configurations for determination are not essential unless explicitly mentioned otherwise, and predetermined processing may be activated in case a determination condition is satisfied, or predetermined processing may be activated in case a determination condition is not satisfied, without limitation thereto.

The program according to the present disclosure is implemented using a script language such as ActionScript or JavaScript (registered trademark), an object-oriented programming language such as Objective-C or Java (registered trademark), or a markup language such as HTML5, for example, although there is no limitation thereto.

FIRST EMBODIMENT

A first embodiment is an embodiment in which stopping (e.g., pausing) or reproduction (e.g., playing) of a moving image that is displayed in a display DP of the terminal 20 are controlled based on an apparent size of the image or the like.

Matter described in the first embodiment can also be applied to other embodiments.

Appearance Configuration of Terminal 20

Figure 3:
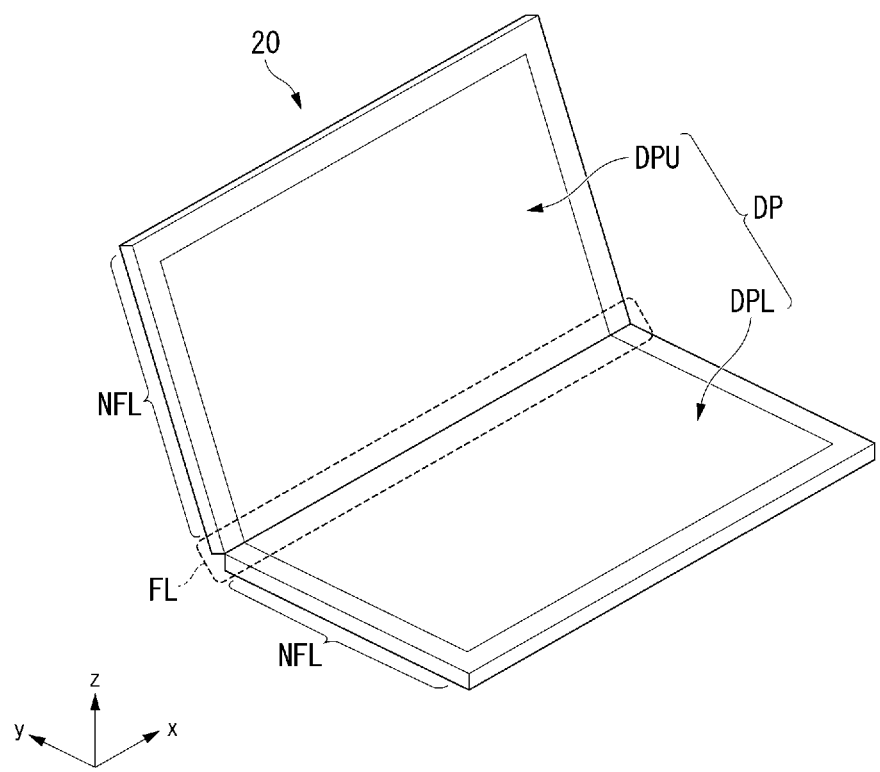
FIG. 3 is a diagram showing an example of an appearance configuration of a terminal of the present embodiment.

FIG. 3 shows an example of an appearance configuration of the terminal 20 of the present embodiment. The terminal 20 is an example of a display device D.

The terminal 20 of the present embodiment includes a foldable display DP as the display 24 described above. In an example, the terminal 20 includes an upper display DPU and a lower display DPL. The upper display DPU and the lower display DPL are connected to each other via a hinge, for example. An angle (i.e., a fold angle θ) formed between the upper display DPU and the lower display DPL is variable. In this example, when the fold angle θ is 0 degrees, the upper display DPU and the lower display DPL are in a closed state. When the fold angle θ is 180 degrees, the upper display DPU and the lower display DPL are in a state of being opened so as to lie horizontally (or in the same plane). In the following description, a portion of a display surface of the display DP at which the upper display DPU and the lower display DPL are connected will be referred to as a fold portion FL, and portions of the display surface of the display DP except for the fold portion FL will be referred to as non-fold portions NFL.

Also, directions will be referred to using x, y, and z axes of a three-dimensional orthogonal coordinate system when necessary.

Note that the fold angle θ of the terminal 20 may optionally exceed 180 degrees.

Also, the configuration in which the terminal 20 includes the foldable display DP is merely an example, and the appearance configuration of the terminal 20 is not limited to this example. For example, a configuration is also possible in which the terminal 20 includes a soft film-like display DP, and can be folded at any position of the display surface of the display DP. In this case, the fold portion FL refers to a position of the display surface of the display DP that is folded. Also, in this case, the non-fold portions NFL refer to portions of the display surface of the display DP except for the fold portion FL.

Image Displayed in Display DP of Terminal 20

Figure 4:
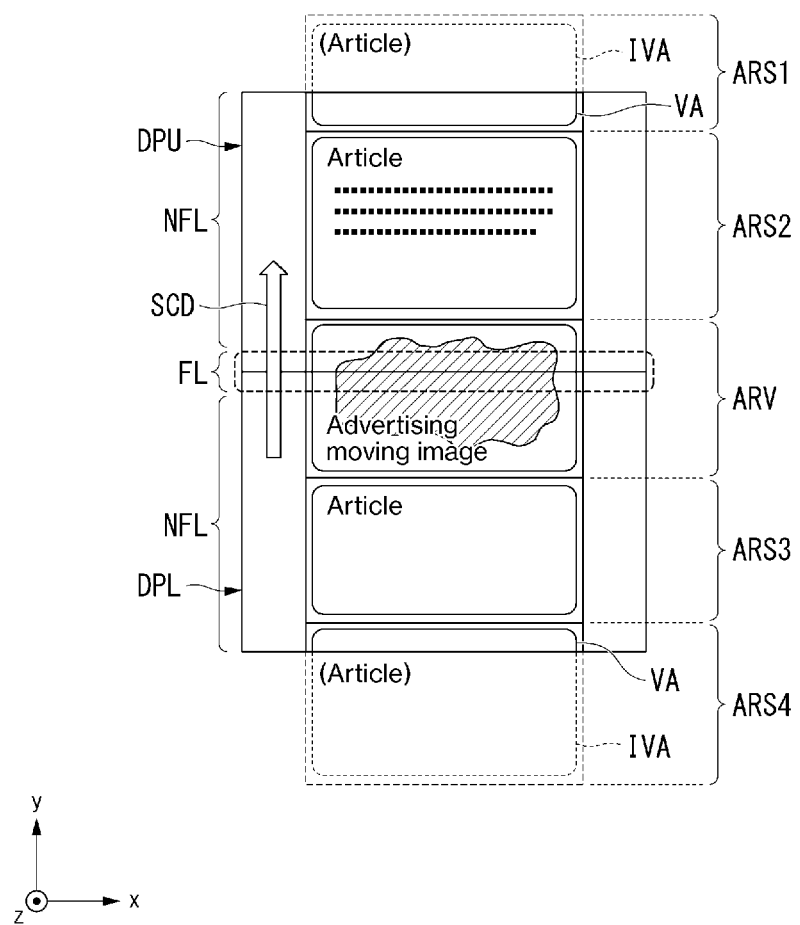
FIG. 4 is a diagram showing an example of an image displayed in a display of the terminal of the present embodiment.

FIG. 4 shows an example of an image that is displayed in the display DP of the terminal 20 of the present embodiment. In this example, the image is displayed in the display DP while the display position of the image is moved from the lower side of the display DP toward the upper side (i.e., in the positive direction of the y axis) as a result of a user U performing a scroll operation in a scroll direction SCD that is the positive direction of the y axis. That is, as a result of the scroll operation performed by the user U, the display position of the image changes from a non-fold portion NFL of the lower display DPL to the fold portion FL and then to a non-fold portion NFL of the upper display DPU, in this order.

Here, a scroll operation is an operation that is performed in order to display an image of a region of an original image as a display target image in the display DP when a display size of the original image that is to be displayed is larger than the screen size of the display DP, for example. More specifically, a scroll operation is an operation for moving a display target region of the original image upward, downward, leftward, rightward, or in a composite direction of any of these directions in the screen to display a portion of the original image that has not been displayed in the screen before the operation, as a new display target region in the screen. In other words, a scroll operation is an operation for changing the range of the original image that is displayed in the display DP.

The image includes contents of still images ARS and contents of moving images ARV. The contents of still images ARS are articles that include text and photographs, for example. The contents of moving images ARV are advertisements that include moving images, for example.

The still images ARS and the moving images ARV are successively displayed in the display DP as a result of the user U performing a scroll operation. A portion of the image that is not displayed in the display DP will be referred to as an undisplayed region IVA, and a portion of the image that is displayed in the display DP will be referred to as a displayed region VA.

Functional Configuration of Controller of Terminal

A functional configuration of the controller 21 included in the terminal 20 will be described referring to FIG. 1 again. The terminal 20 includes, as functions that are implemented by the controller 21, a moving image information acquisition unit 211, a folding information acquisition unit 212, a display state calculation unit 213, an operator information acquisition unit 214, an orientation information acquisition unit 215, and a display controller 216.

The display controller 216 controls display of an image in the display DP. For example, the display controller 216 acquires an operation state of a scroll operation (e.g., the presence or absence of the scroll operation, direction, speed, amount and the like of the operation) performed by the user U via the input/output device 23, and changes the display position of the image according to the acquired state of the scroll operation. The display controller 216 outputs the display position of the image to the moving image information acquisition unit 211. For example, the display controller 216 outputs, to the moving image information acquisition unit 211, moving image position information DV relating to a position at which a moving image ARV is displayed.

Also, in the case where the displayed image includes the moving image ARV, the display controller 216 controls the stopping and the reproduction of the moving image ARV displayed in the display DP. The moving image ARV includes a plurality of frame images. Reproducing the moving image ARV means successively displaying the plurality of frame images constituting the moving image ARV in chronological order. Stopping the moving image ARV means continuously displaying a frame image among the plurality of frame images constituting the moving image ARV.

The moving image information acquisition unit 211 acquires image information IM from the storage 15 of the server 10. The image information IM includes information of images constituting the moving image ARV and information that indicates a display size or a display area, such as the number of pixels, of the moving image ARV in the display DP. Note that the image information IM may optionally include information relating to still images ARS.

Also, the moving image information acquisition unit 211 acquires the moving image position information DV output by the display controller 216. The moving image position information DV includes information that indicates the display position of the moving image ARV displayed in the display DP. That is, the moving image information acquisition unit 211 acquires information indicating the display position of the moving image ARV displayed in the display DP.

The folding information acquisition unit 212 acquires fold state information DF relating to a fold state of the display DP. In an example, the terminal 20 includes an angle sensor 29 that detects an angle (fold angle θ) formed between the upper display DPU and the lower display DPL. The folding information acquisition unit 212 acquires the fold angle θ detected by the angle sensor 29 as the fold state information DF.

The display controller 216 described above controls the stopping and the reproduction of the moving image ARV displayed in the display DP based on the moving image position information DV acquired by the moving image information acquisition unit 211 and the fold state information DF acquired by the folding information acquisition unit 212.

In an example, the display controller 216 controls the stopping and the reproduction of the moving image ARV based on an apparent size AP of the moving image ARV as a result of the display DP being folded.

In this case, the display state calculation unit 213 calculates the apparent size AP of the moving image ARV displayed in the display DP based on the moving image position information DV and the fold state information DF. The display state calculation unit 213 outputs the calculated apparent size AP to the display controller 216.

The apparent size AP of the moving image ARV may be determined based on the length of a line segment that connects an upper end and a lower end of the moving image ARV in the y axis direction, or based on another value.

The display controller 216 controls the stopping and the reproduction of the moving image ARV displayed in the display DP based on the apparent size AP calculated by the display state calculation unit 213. That is, the display controller 216 controls the stopping and the reproduction of the moving image ARV displayed in the display DP based on the moving image position information DV and the fold state information DF.

The operator information acquisition unit 214 acquires a position of the user U who operates the terminal 20, relative to the terminal 20, or a direction STD of a line of sight of the user U viewing the terminal 20. In an example, the terminal 20 includes, as the camera 27 described above, a camera (which is called a front camera) that can capture an image of the face of the user U operating the terminal 20. In this case, the operator information acquisition unit 214 acquires the position of the user U relative to the terminal 20 or the line-of-sight direction STD of the user U viewing the terminal 20 based on the image of the face of the user U captured by the front camera.

The orientation information acquisition unit 215 acquires orientation information that indicates an orientation of the terminal 20. In an example, the terminal 20 includes an orientation sensor that can detect an orientation of the terminal 20 relative to the gravitational direction. In this case, the orientation information acquisition unit 215 acquires the orientation of the terminal 20 detected by the orientation sensor as the orientation information.

Operations of Controller of Terminal

Operations of the controller 21 included in the terminal 20 of the present embodiment will be described with reference to FIG. 5.

Figure 5:
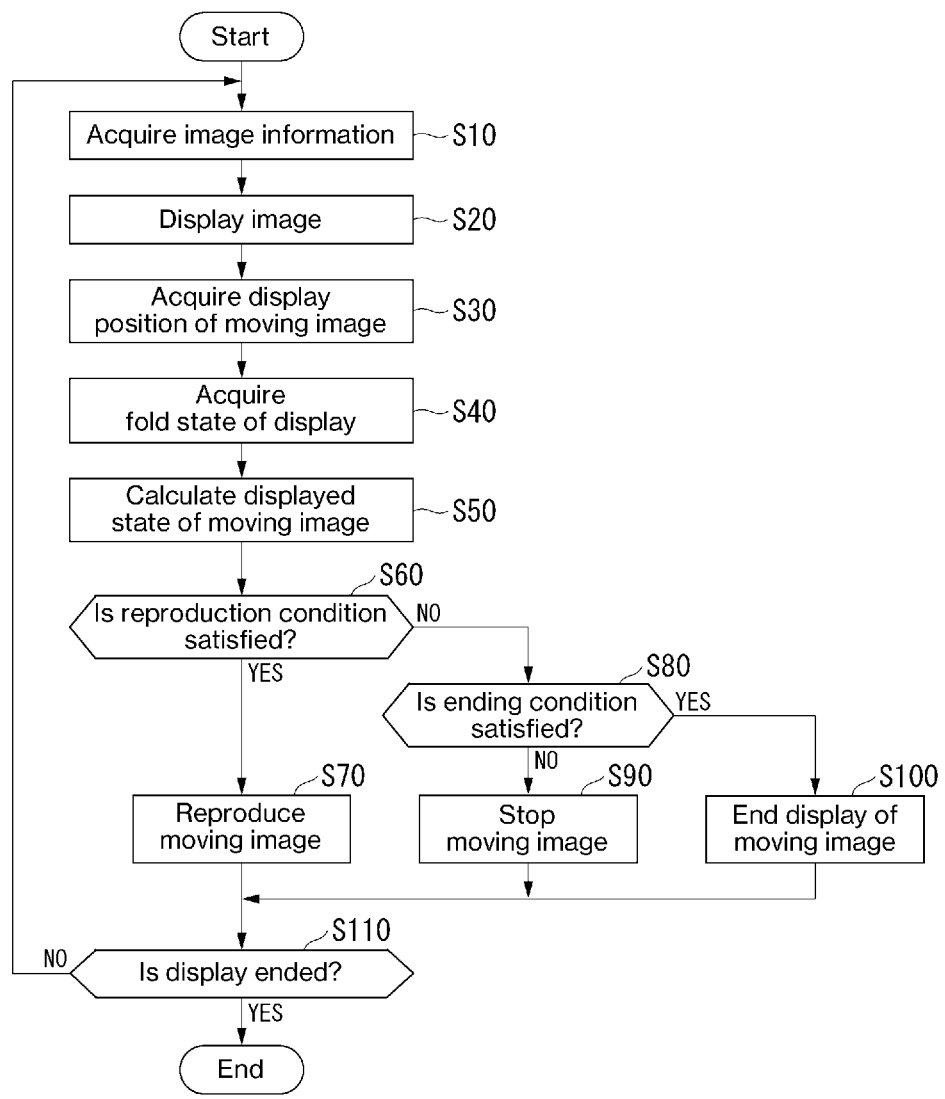
FIG. 5 is a diagram showing an example of operations of a controller included in the terminal of the present embodiment.

FIG. 5 shows an example of the operations of the controller 21 included in the terminal 20 of the present embodiment.

Operation S10: The moving image information acquisition unit 211 of the controller 21 acquires image information IM from the server 10. As described above, the image information IM includes information of images constituting the moving image ARV and information that indicates a display size or a display area, such as the number of pixels, of the moving image ARV in the display DP.

Operation S20: The display controller 216 displays an image in the display DP based on the image information IM acquired by the moving image information acquisition unit 211. If the image that is displayed includes a moving image ARV, the display controller 216 outputs, to the moving image information acquisition unit 211, moving image position information DV indicating the display position of the moving image ARV in the display DP.

Operation S30: The moving image information acquisition unit 211 acquires the moving image position information DV from the display controller 216. The moving image position information DV indicates the position in the display DP at which the moving image ARV is displayed.

Operation S40: The folding information acquisition unit 212 acquires a fold angle θ that is an angle formed between the upper display DPU and the lower display DPL. Note that if the terminal 20 is configured such that the position of the fold portion FL is variable, the folding information acquisition unit 212 may optionally acquire information that indicates a fold position in addition to the fold angle θ.

Operation S50: The display state calculation unit 213 calculates a displayed state of the moving image ARV based on the moving image position information DV and the fold state information DF. More specifically, the display state calculation unit 213 calculates an apparent size AP of the moving image ARV displayed in the display DP based on the moving image position information DV and the fold state information DF. Here, examples of the apparent size AP will be described with reference to FIGS. 6A and 6B.

Figure 6A:
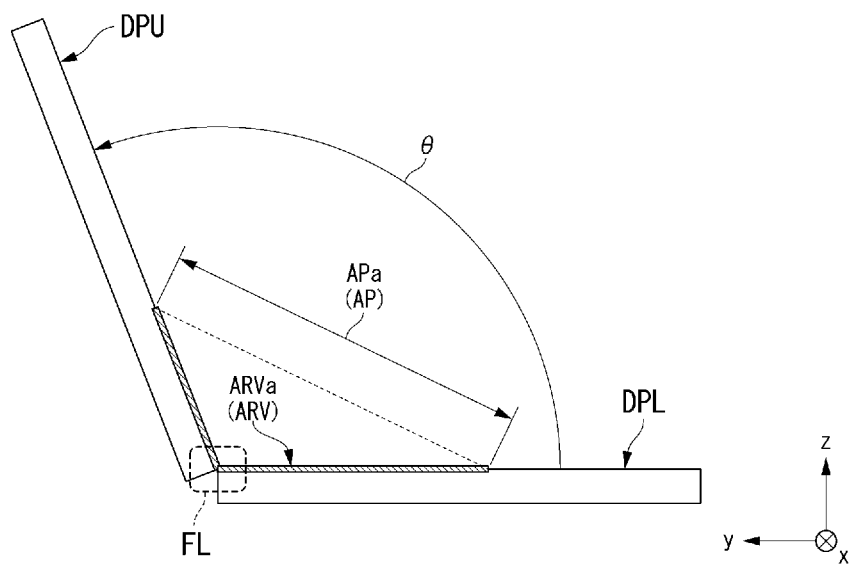
FIGS. 6A and 6B are diagrams showing example apparent sizes of a moving image in the display of the present embodiment.
Figure 6B:
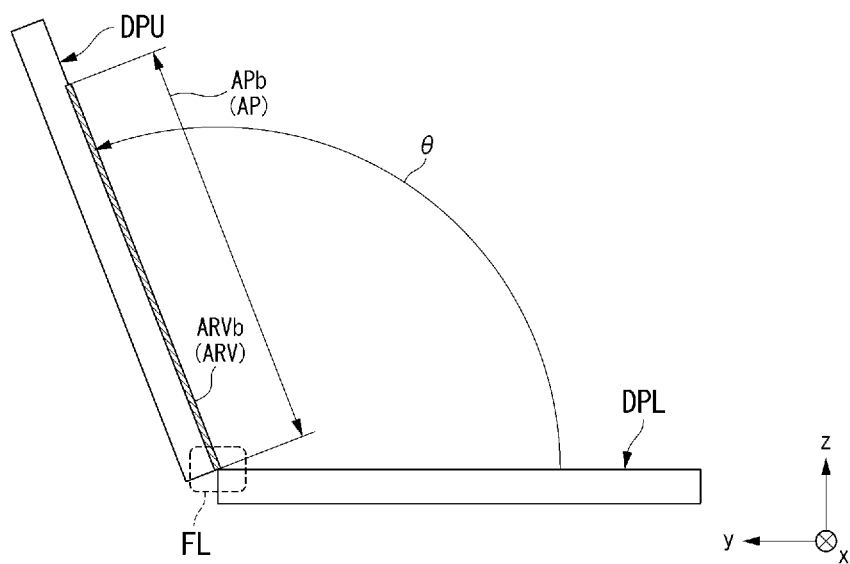

FIGS. 6A and 6B show examples of the apparent size AP of the moving image ARV displayed in the display DP in the present embodiment. FIG. 6A shows an example of an apparent size APa in a case where a portion of a moving image ARVa is positioned at the fold portion FL. FIG. 6B shows an example of an apparent size APb in a case where a moving image ARVb is not positioned at the fold portion FL. The moving image ARVa shown in FIG. 6A moves to the position shown in FIG. 6B (i.e., the position of the moving image ARVb) as a result of a scroll operation being performed upward (in the positive direction of the y axis) in the display DP.

(1) Calculate Apparent Size AP Based on Fold Angle θ

The apparent size AP of the moving image ARV varies depending on the magnitude of the fold angle θ. For example, if the moving image ARV is displayed between the upper display DPU and the lower display DPL, i.e., on a region that includes the fold portion FL, the apparent size of the moving image ARV varies depending on the magnitude of the fold angle θ. Also, the apparent size AP of the moving image ARV depends on the position in the display DP at which the moving image ARV is displayed. The display state calculation unit 213 calculates the apparent size AP based on the fold angle θ and the display position of the moving image ARV in the display DP.

(2) Calculate Apparent Size AP Based on Display Area of Moving Image ARV

The apparent size AP of the moving image ARV varies depending on a display area of the moving image ARV in the display DP. The display state calculation unit 213 calculates the apparent size AP based on the display area of the moving image ARV in the display DP and the display position of the moving image ARV in the display DP. Note that in this case, the display state calculation unit 213 may optionally calculate the apparent size AP based on the fold angle θ as well.

In both of the above cases (1) and (2), when the display DP is folded, the apparent size AP of the moving image ARV is changed based on the position in the display DP at which the moving image ARV is displayed.

As described above, the display position of the moving image ARV changes due to a scroll operation, for example. Here, even if the fold angle θ does not change, the apparent size AP varies depending on whether or not the moving image ARV is positioned at the fold portion FL. For example, as shown in FIG. 6A, the apparent size APa of the case where the moving image ARV (i.e., the moving image ARVa) is positioned at the fold portion FL is smaller than the apparent size APb of the case where the moving image ARV (i.e., the moving image ARVb) is not positioned at the fold portion FL. That is, even if the fold angle θ does not change, the apparent size AP of the moving image ARV is changed based on the position in the display DP at which the moving image ARV is displayed.

Operations S60 to S100

The display controller 216 controls the stopping and the reproduction of the moving image ARV based on the calculated apparent size AP or the magnitude of the fold angle θ. The following describes, as an example, the above-described case (1) where the apparent size AP is calculated based on the fold angle θ.

That is, the fold state information DF includes information of the fold angle θ that is formed as a result of the display DP being folded, and the display controller 216 controls the stopping and the reproduction of the moving image ARV displayed in the display DP based on the fold angle θ.

In an example of the present embodiment, the display controller 216 controls the moving image ARV so as to enter any of a reproduced state, a stopped state, and a reproduction ended state. Here, the reproduction ended state refers to a state where a reproduction frame counter for the moving image ARV is initialized, or a state where image data that is necessary to reproduce the moving image ARV is erased, for example.

Figure 7:
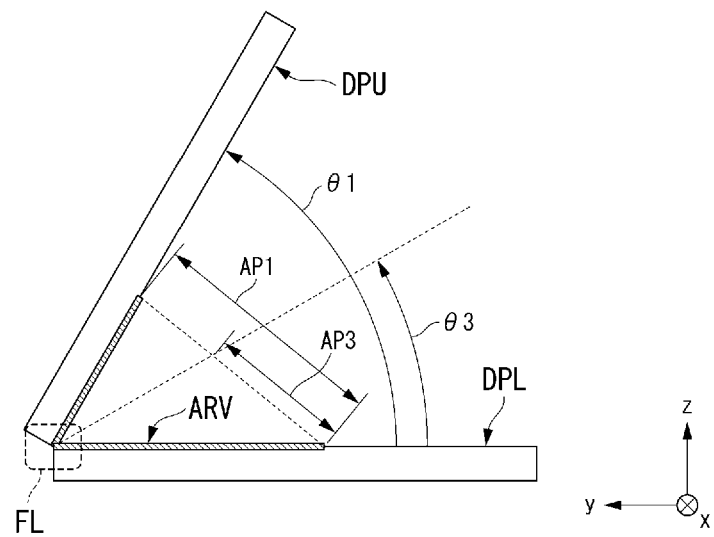
FIG. 7 is a diagram showing a first example of a fold angle of the display of the present embodiment.

FIG. 7 shows a first example of the fold angle θ of the display DP in the present embodiment. In the case of a fold angle θ1, the apparent size AP of the moving image ARV is AP1 shown in FIG. 7. In the case of a fold angle θ3 that is smaller than the fold angle θ1, the apparent size AP of the moving image ARV is AP3. The size AP3 is smaller than the size AP1 of the case where the fold angle is θ1.

Figure 8:
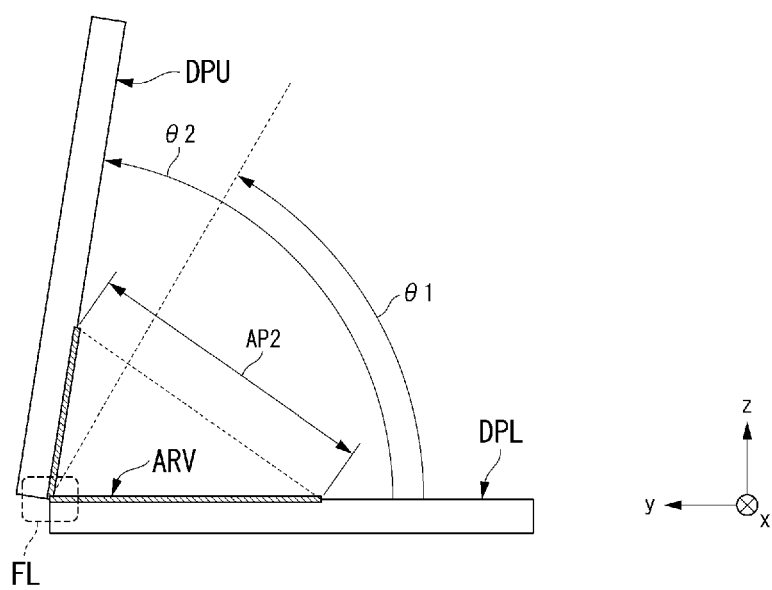
FIG. 8 is a diagram showing a second example of the fold angle of the display of the present embodiment.

FIG. 8 shows a second example of the fold angle θ of the display DP in the present embodiment. In the case of a fold angle θ2 that is greater than the fold angle θ1, the apparent size AP of the moving image ARV is AP2 shown in FIG. 8. The size AP2 is greater than the size AP1 of the case where the fold angle is θ1.

Reproduction Condition

In an example of the present embodiment, a reproduction condition is satisfied if the apparent size AP is at least the size AP1 (or greater than the size AP1). For example, if the apparent size AP is the size AP2, the reproduction condition is satisfied.

Note that the display controller 216 may optionally perform control to reproduce the moving image ARV displayed in the display DP when the fold angle θ has changed from an angle that is not greater than the fold angle θ1 (i.e., smaller than the fold angle θ1) to at least the fold angle θ2 or greater than the fold angle θ2.

Stop Condition

In this example, a stop condition is satisfied if the apparent size AP is not greater than the size AP1 (or smaller than the size AP1) and is at least the size AP3 (or greater than the size AP3).

That is, the display controller 216 performs control to stop the moving image ARV displayed in the display DP if the fold angle θ is not greater than the fold angle θ1, which is a set angle, or is smaller than the fold angle θ1.

Reproduction Ending Condition

A reproduction ending condition is satisfied if the apparent size AP is smaller than the size AP3 (or not greater than the size AP3).

That is, the display controller 216 ends display of the moving image ARV if the fold angle θ is the fold angle θ3 that is smaller than the fold angle θ1.

FIG. 9 shows, as another example, a case where the terminal 20 is configured such that the fold angle θ can be greater than 180 degrees.

FIG. 9 shows an example of the apparent size AP in the case where the fold angle θ of the terminal 20 of the present embodiment can be greater than 180 degrees. If the upper display DPU is opened past a reference angle line HL of the lower display DPL (i.e., the fold angle θ is greater than 180 degrees), it is difficult for the user U to see a portion of the moving image ARV that is displayed in the upper display DPU. In this case, the apparent size AP of the moving image ARV is AP4. In this case, the display controller 216 may optionally control the stopping and the reproduction of the moving image ARV based on a ratio between the size of the portion of the moving image ARV displayed in the upper display DPU and the size of a portion of the moving image ARV displayed in the lower display DPL.

That is, the display controller 216 controls the stopping and the reproduction of the moving image ARV displayed in the display DP based on a positional relationship between the position in the folded display DP at which the moving image ARV is displayed and the user U of the terminal 20.

In other words, the display controller 216 reproduces the moving image ARV when the apparent size AP of the moving image ARV is at least a set size or greater than the set size. Also, the display controller 216 stops the moving image ARV when the apparent size AP of the moving image ARV is not greater than the set size or smaller than the set size. Note that the size referred to here is a concept that includes the area of the moving image ARV, the length of a side of the moving image ARV, and the like.

Operations S60 to S100: As shown in FIG. 5, the display controller 216 determines whether or not any of the reproduction condition, the stop condition, and the reproduction ending condition of the moving image ARV is satisfied, and controls reproduction, stopping, or ending of reproduction of the moving image ARV.

Operation S110: The display controller 216 repeatedly executes operations S10 to S100 until an image display ending condition is satisfied (e.g., until an operation for ending display is performed by the user U).

Variation (1) of First Embodiment: Control Based on Positional Relationship Between Terminal 20 and User U The display controller 216 may control the stopping and the reproduction of the moving image ARV based on a positional relationship between the terminal 20 and the user U.

Figure 10A:
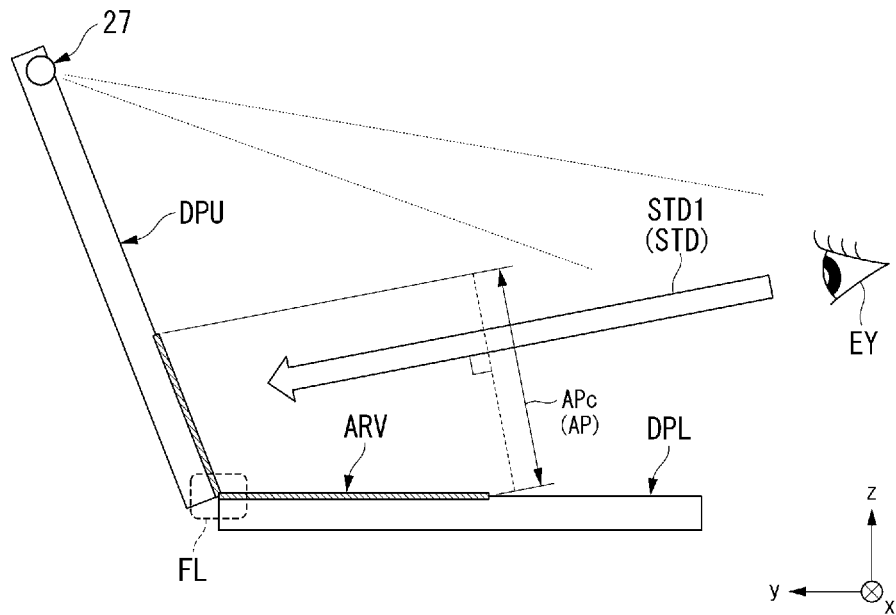
FIGS. 10A and 10B show example positional relationships between the terminal of the present embodiment and a user.
Figure 10B:
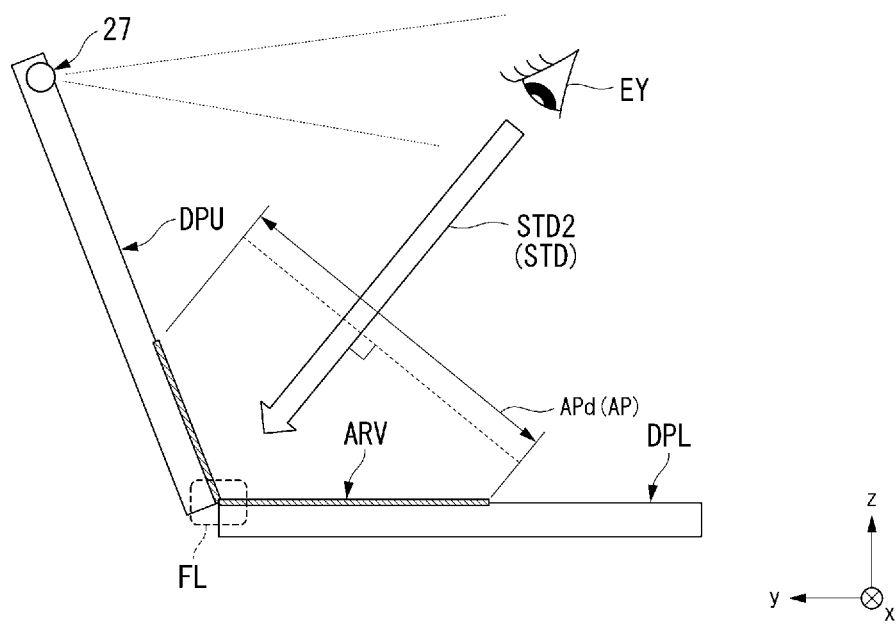

FIGS. 10A and 10B show examples of the positional relationship between the terminal 20 of the present embodiment and the user U. FIG. 10A shows a first example of the positional relationship between the terminal 20 of the present embodiment and the user U. FIG. 10B shows a second example of the positional relationship between the terminal 20 of the present embodiment and the user U.

As described above, the operator information acquisition unit 214 acquires the position of the user U who operates the terminal 20, relative to the terminal 20, or the line-of-sight direction STD of the user U viewing the terminal 20 based on an image of the user U captured by the camera 27. The display controller 216 controls the stopping and the reproduction of the moving image ARV displayed in the display DP based on the line-of-sight direction STD of the user U of the terminal 20 or the positional relationship between the terminal 20 and the user U.

In an example, the display controller 216 calculates the apparent size AP, taking a direction that is orthogonal to the line-of-sight direction STD of the user U of the terminal 20 to be the direction of the apparent size AP.

Here, if the line-of-sight direction STD of the user U of the terminal 20 changes, the apparent size AP changes with the change in the line-of-sight direction STD. For example, an apparent size APc of a case where the line-of-sight direction is STD1 shown in FIG. 10A is smaller than an apparent size APd of a case where the line-of-sight direction is STD2 shown in FIG. 10B. The display controller 216 controls the stopping and the reproduction of the moving image ARV displayed in the display DP based on the apparent size AP that changes according to the line-of-sight direction STD of the user U of the terminal 20 or the positional relationship between the terminal 20 and the user U.

Note that the display controller 216 may optionally calculate the positional relationship between the terminal 20 and the user U based on a position of the head, the face, or an eye EY of the user U instead of or in addition to the line-of-sight direction STD of the user U.

Variation (2) of First Embodiment: Control Based on Orientation of Terminal 20

The display controller 216 may optionally control the stopping and the reproduction of the moving image ARV displayed in the display DP based on an orientation of the terminal 20.

As described above, the apparent size AP of the moving image ARV displayed in the display DP changes according to the positional relationship between the terminal 20 and the user U. The display controller 216 of this variation controls the stopping and the reproduction of the moving image ARV based on a fact that an orientation of the terminal 20 (e.g., a display direction of the display DP relative to the gravitational direction) indicates a positional relationship between the terminal 20 and the user U.

More specifically, the orientation information acquisition unit 215 acquires orientation information that indicates an orientation of the terminal 20. The display controller 216 may estimate the positional relationship between the terminal 20 and the user U based on the orientation information of the terminal 20 acquired by the orientation information acquisition unit 215 to control the stopping and the reproduction of the moving image ARV.

Figure 11:
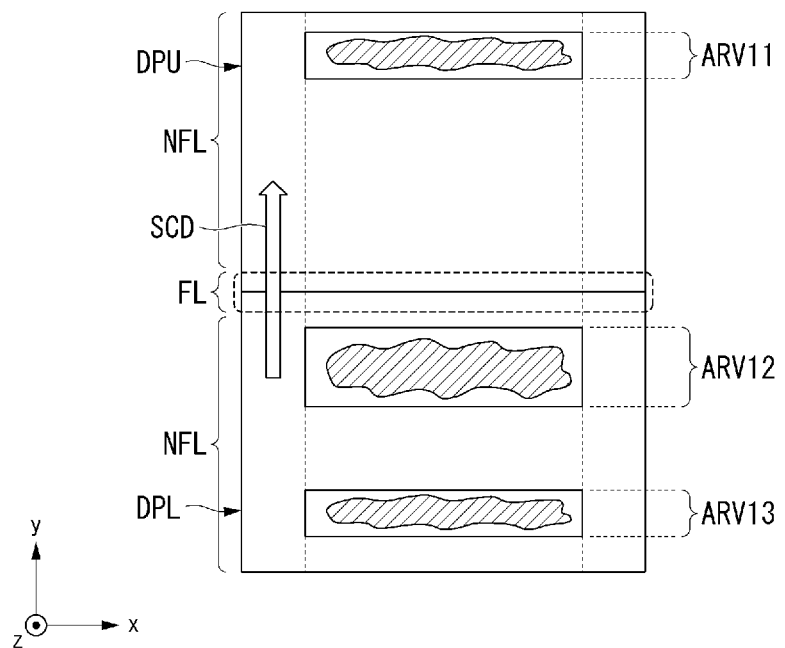
FIG. 11 is a diagram showing example display positions of a moving image in the present embodiment.

Variation (3) of First Embodiment: Display Moving Image ARV at Non-Fold Portion NFL FIG. 11 shows examples of the display position of the moving image ARV in the present embodiment. If the moving image ARV is to be displayed at the position of the fold portion FL as a result of a scroll operation being performed by the user U, the display controller 216 may optionally move the display position of the moving image ARV to a non-fold portion NFL. That is, the display controller 216 may optionally display an image relating to the moving image ARV at a position different from the position of the fold portion FL of the display DP.

For example, as shown in FIG. 11, the display controller 216 displays the moving image ARV at any of display positions of moving images ARV11 to ARV13. These display positions are at non-fold portions NFL.

Note that the image relating to the moving image ARV includes an image for accepting an operation from the user U. In an example, the image relating to the moving image ARV is a banner advertisement in which a moving image is used and that urges an operation for accessing a predetermined Uniform Resource Locator (URL). The display controller 216 displays the image (e.g., banner advertisement) relating to the moving image ARV at a display position in the display DP that is spaced apart from the fold portion FL.

Effects of First Embodiment

If an image is displayed at the fold portion FL when displaying images in the foldable display DP, the visibility of the image from the user U is lower than images that are displayed at other portions. In a case where the displayed image is an advertising moving image, for example, a viewing rate of the advertisement displayed at the fold portion FL is lower than cases of being displayed at other portions, and it has been difficult to improve advertisement effects.

The display device D of the present embodiment controls the stopping and the reproduction of the moving image ARV displayed in the display DP based on the display position of the moving image ARV and a fold state of the display DP.

With the display device D configured as described above, it is possible to stop and reproduce the moving image ARV based on how the moving image ARV appears for the user U. For example, the display device D reproduces the moving image ARV when the moving image ARV can be clearly seen from the user U and stops the moving image ARV when the moving image ARV cannot be clearly seen from the user U. Therefore, with the display device D of the present embodiment, it is possible to control the stopping and the reproduction of the moving image ARV based on visibility of the moving image ARV from the user U.

Also, the display device D of the present embodiment controls the stopping and the reproduction of the moving image ARV displayed in the display DP based on an apparent size AP of the moving image ARV when viewed by the user U. Therefore, with the display device D of the present embodiment, it is possible to control the stopping and the reproduction of the moving image ARV based on visibility that varies according to the apparent size of the moving image ARV viewed by the user U.

Also, the display device D of the present embodiment stops reproduction of the moving image ARV when the apparent size of the moving image is not greater than a set size or smaller than the set size. According to the display device D configured as described above, reproduction of the moving image ARV is stopped if visibility of the moving image ARV from the user U has decreased, and therefore, effects of presenting the moving image ARV to the user U can be improved when compared to a case where reproduction of the moving image ARV is continued in a state where the visibility is low. Also, according to the display device D configured as described above, it is possible to reduce consumption of resources such as power and a memory for reproducing the moving image ARV.

Also, the display device D of the present embodiment determines the apparent size of the moving image ARV based on the display position of the moving image ARV. According to the display device D configured as described above, the apparent size of the moving image ARV can be easily determined, and therefore, it is possible to reduce consumption of resources such as power and the memory for reproducing the moving image ARV.

Also, when a display region is folded, the display device D of the present embodiment changes the apparent size of the moving image ARV based on the display position of the moving image ARV. According to the display device D configured as described above, it is possible to suppress a reduction in visibility of the moving image ARV from the user U even when the apparent size of the moving image ARV varies due to the fold angle θ of the display DP changing, for example.

Also, the display device D of the present embodiment determines the apparent size of the moving image ARV based on a display area of the moving image ARV. According to the display device D configured as described above, the apparent size of the moving image ARV can be easily determined, and therefore, it is possible to reduce consumption of resources such as power and the memory for reproducing the moving image ARV.

Also, the display device D of the present embodiment controls the stopping and the reproduction of the moving image ARV based on the fold angle θ of the display DP. According to the display device D of the present embodiment configured as described above, it is possible to control the stopping and the reproduction of the moving image ARV based on visibility that varies according to the apparent size of the moving image ARV viewed by the user U.

Also, the display device D of the present embodiment performs control to stop the moving image ARV when the fold angle θ of the display DP is not greater than a first angle or smaller than the first angle. According to the display device D configured as described above, reproduction of the moving image ARV is stopped when visibility of the moving image ARV from the user U has decreased, and therefore, effects of presenting the moving image ARV to the user U can be improved when compared to a case where reproduction of the moving image ARV is continued in a state where the visibility is low. Also, according to the display device D configured as described above, it is possible to reduce consumption of resources such as power and the memory for reproducing the moving image ARV.

Also, the display device D of the present embodiment performs control to reproduce the moving image ARV when the fold angle θ of the display DP has changed from an angle that is not greater than the first angle or smaller than the first angle to at least a second angle or greater than the second angle, the second angle being greater than or equal to the first angle. According to the display device D configured as described above, the moving image ARV is reproduced when visibility of the moving image ARV from the user has improved, and therefore, an operation for reproducing the moving image ARV can be simplified when compared to a case where the operation is performed by the user U. Also, according to the display device D configured as described above, it is possible to reduce consumption of resources such as power and a memory for detecting the operation for reproducing the moving image ARV.

Also, the display device D of the present embodiment performs control to end display of the moving image ARV when the fold angle θ of the display DP is not greater than the first angle or smaller than the first angle. According to the display device D configured as described above, reproduction of the moving image ARV is stopped when visibility of the moving image ARV from the user U has decreased, and therefore, effects of presenting the moving image ARV to the user U can be improved when compared to a case where reproduction of the moving image ARV is continued in a state where the visibility is low. Also, according to the display device D configured as described above, it is possible to reduce consumption of resources such as power and the memory for reproducing the moving image ARV.

Also, the display device D of the present embodiment controls the stopping and the reproduction of the moving image ARV based on a positional relationship between the display position of the moving image ARV and the user U. According to the display device D configured as described above, visibility of the moving image ARV from the user U is determined based on the positional relationship between the display position of the moving image ARV and the user U, and therefore, the degree of visibility of the moving image ARV can be precisely determined.

Also, the display device D of the present embodiment controls the stopping and the reproduction of the moving image ARV based on the direction of a line of sight of the user U or the positional relationship between the display device D and the user U. According to the display device D configured as described above, the degree of visibility of the moving image ARV from the user U can be precisely determined.

Also, the display device D of the present embodiment controls the stopping and the reproduction of the moving image ARV based on an orientation of the display device D. According to the display device D configured as described above, the degree of visibility of the moving image ARV can be determined using a simple mechanism.

Also, the display device D of the present embodiment displays an operation image at a position in the display region that is different from the fold portion FL. According to the display device D configured as described above, operability for the user U can be improved when compared to a case where the operation image is displayed at the fold portion FL where it is difficult to perform an operation.

Stopping the moving image ARV in the display device D of the present embodiment means continuously displaying a frame image among the plurality of frame images constituting the moving image (e.g., entering a pause state or stop motion). According to the display device D configured as described above, when the display device has entered a state where the moving image ARV can be reproduced, the reproduction can be started from an intermediate frame at which the reproduction was stopped, rather than the first frame of the moving image ARV, and effects of presenting the moving image ARV can be enhanced. Also, according to the display device D configured as described above, a reproduction time can be reduced when compared to a case where the moving image ARV is reproduced from the beginning, and therefore, it is possible to reduce consumption of resources such as power and the memory for reproducing the moving image ARV.

Also, the display device D of the present embodiment performs control for ending reproduction of the moving image ARV based on the apparent size AP, in addition to control for stopping or reproducing the moving image. According to the display device D configured as described above, if visibility of the moving image ARV from the user U has significantly decreased, it is possible to reduce consumption of resources such as power and the memory for reproducing the moving image ARV.

Also, the display device D of the present embodiment controls the stopping and the reproduction of the moving image ARV based on the fold angle θ of the display DP. Commonly, it is difficult to calculate an apparent size AP of a moving image ARV, but according to the display device D configured as described above, the fold angle θ of the display DP is acquired instead of the apparent size AP of the moving image ARV, and therefore, it is possible to control the stopping and the reproduction of the moving image ARV with a relatively simple configuration.

Also, the display device D of the present embodiment controls the stopping and the reproduction of the moving image ARV according to a change in the fold angle θ of the display DP. Therefore, even when visibility for the user U varies due to the fold angle θ of the display DP being changed while the moving image ARV is displayed, it is possible to control the stopping and the reproduction of the moving image ARV according to the change in visibility for the user U.

Also, the display device D of the present embodiment controls the stopping and the reproduction of the moving image ARV based on a detection result of a line of sight of the user U or a position of the face of the user U, or an orientation of the display device D. As described above, the apparent size AP of the moving image ARV displayed in the display DP varies according to the positional relationship between the terminal 20 and the user U. The display controller 216 of this variation controls the stopping and the reproduction of the moving image ARV based on a fact that the line of sight of the user U or the position of the face of the user U indicates the positional relationship between the terminal 20 and the user U or a fact that the orientation of the terminal 20 indicates the positional relationship between the terminal 20 and the user U. According to the display device D configured as described above, even when visibility for the user U varies due to a change in positions of the display device D and the user U relative to each other, it is possible to control the stopping and the reproduction of the moving image ARV according to the change in visibility for the user U.

Also, in a case where the moving image ARV is an image (e.g., a banner advertisement) on which the user U makes an operation, the display device D of the present embodiment performs control such that the image is not displayed at the fold portion FL and is displayed at a non-fold portion NFL. Commonly, it is difficult for the user U to make an operation on the display surface of the display DP in the fold portion FL. Accordingly, if the image on which the user U makes an operation is displayed at the fold portion FL, it is difficult for the user U to make the operation. According to the display device D configured as described in the present embodiment, ease of the operation performed by the user U can be improved. Since ease of the operation performed on the image by the user U can be improved with the display device D of the present embodiment, advertisement effects can be improved in the case where the image is a banner advertisement, for example.

Also, the display device D of the present embodiment stops reproduction of the moving image ARV when the moving image ARV is displayed at a position that cannot be seen from the user U. For example, when the upper display DPU is opened past the reference angle line HL of the lower display DPL (i.e., the fold angle θ is greater than 180 degrees) as shown in FIG. 9, it is difficult for the user U to see a portion of the moving image ARV that is displayed in the upper display DPU. Commonly, when a moving image ARV is reproduced, viewing effects of the moving image ARV (e.g., advertisement effects in a case where the moving image ARV is an advertising moving image) may decrease if the moving image ARV is reproduced to the end without being viewed by the user U. According to the display device D configured as described in the present embodiment, reproduction of the moving image ARV is stopped when visibility for the user U has decreased due to a change in positions of the display device D and the user U relative to each other, and therefore, it is possible to suppress a reduction in the viewing effects of the moving image ARV.

SECOND EMBODIMENT

A second embodiment will be described. The second embodiment is an embodiment in which stopping or reproduction of a moving image ARV displayed in the display DP of the terminal 20 are controlled based on the display position of the moving image ARV and the position of the fold portion FL of the display DP.

Note that configurations and operations that are similar to those in the first embodiment will be denoted using the same reference signs as those used in the first embodiment, and descriptions thereof will be omitted. Matter described in the second embodiment can also be applied to other embodiments.

The display controller 216 of the present embodiment controls the moving image ARV displayed in the display DP based on moving image position information DV and fold position information DFL. A specific example will be described with reference to FIG. 12.

Figure 12:
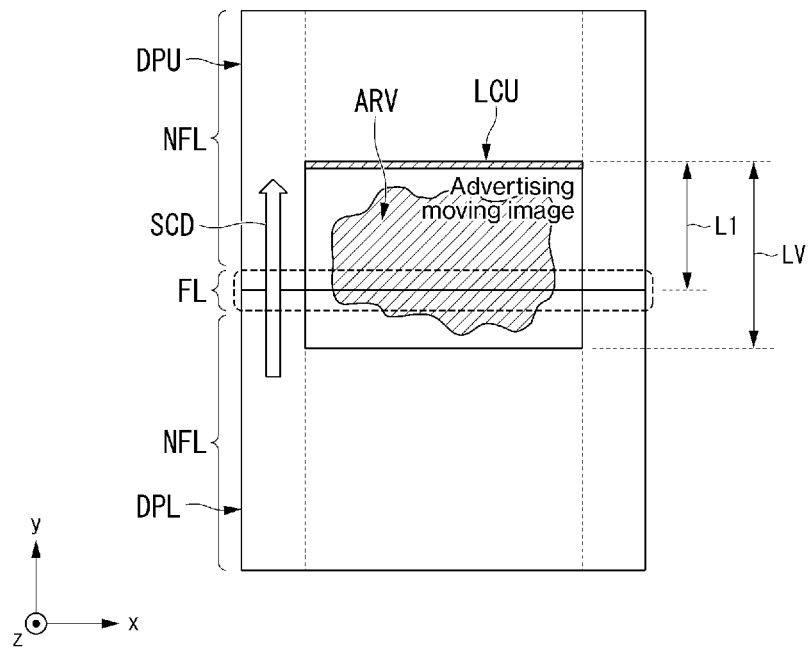
FIG. 12 shows a first example of a positional relationship between the display position of a moving image and the position of a fold portion in the present embodiment.

FIG. 12 shows a first example of a positional relationship between the display position of the moving image ARV and the position of the fold portion FL in the present embodiment. Moving-image reference position information LC is associated with the moving image ARV. The position of the moving-image reference position information LC moves as the display position of the moving image ARV moves due to a scroll operation. That is, the moving-image reference position information LC indicates the display position of the moving image ARV in the display DP. In this example, upper moving-image reference position information LCU is set at the upper end of the moving image ARV in the y axis direction. That is, the upper moving-image reference position information LCU indicates the position of the upper end of the moving image ARV displayed in the display DP. The moving image information acquisition unit 211 acquires the upper moving-image reference position information LCU as the moving image position information DV.

Note that a case is described here as an example in which the moving-image reference position information LC is the upper moving-image reference position information LCU (i.e., information indicating the position of the upper end of the moving image ARV), but there is no limitation to such a case. The moving-image reference position information LC may be information that indicates the position of the lower end of the moving image ARV, information that indicates the position of a middle point between the upper end and the lower end of the moving image ARV (i.e., a center point of the moving image ARV), or information that indicates another position in the moving image ARV.

The display state calculation unit 213 calculates a distance (distance L1 in the illustrated example) between the display position of the moving image ARV indicated by the upper moving-image reference position information LCU and the position of the fold portion FL. If the calculated distance L1 is not greater than a predetermined value or smaller than the predetermined value, the display state calculation unit 213 calculates (determines) that the moving image ARV is displayed at the position of the fold portion FL. If it is calculated (determined) that the moving image ARV is displayed at the position of the fold portion FL, the display controller 216 determines that a reproduction condition, which will be described later, is satisfied, and executes reproduction of the moving image ARV. Note that the predetermined value may optionally be determined based on a display length (distance LV) of the moving image ARV. In a case where the predetermined value is the distance LV, for example, the display state calculation unit 213 calculates (determines) that the moving image ARV is displayed at the position of the fold portion FL if the distance L1 between the display position of the moving image ARV indicated by the upper moving-image reference position information LCU and the position of the fold portion FL is not greater than the distance LV or smaller than the distance LV. If it is calculated (determined) that the moving image ARV is displayed at the fold portion FL, the display controller 216 determines that a stop condition is satisfied, and performs control to stop reproduction of the moving image ARV.

Figure 13:
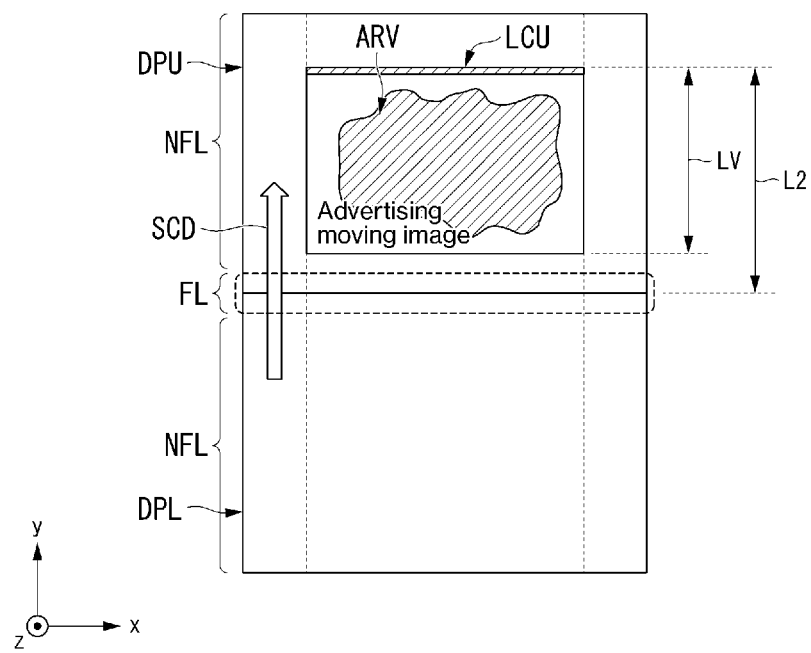
FIG. 13 is a diagram showing a second example of the positional relationship between the display position of the moving image and the position of the fold portion in the present embodiment.

FIG. 13 shows a second example of the positional relationship between the display position of the moving image ARV and the position of the fold portion FL in the present embodiment. The display state calculation unit 213 calculates a distance (distance L2 in the illustrated example) between the display position of the moving image ARV indicated by the upper moving-image reference position information LCU and the position of the fold portion FL. Here, the distance L2 is longer than the distance L1. If the calculated distance L2 is at least the predetermined value or greater than the predetermined value, the display state calculation unit 213 calculates (determines) that the moving image ARV is not displayed at the position of the fold portion FL (i.e., the moving image ARV is displayed at a non-fold portion NFL).

Operations of Controller of Terminal

Operations of the controller 21 included in the terminal 20 of the present embodiment will be described with reference to FIG. 14.

Figure 14:
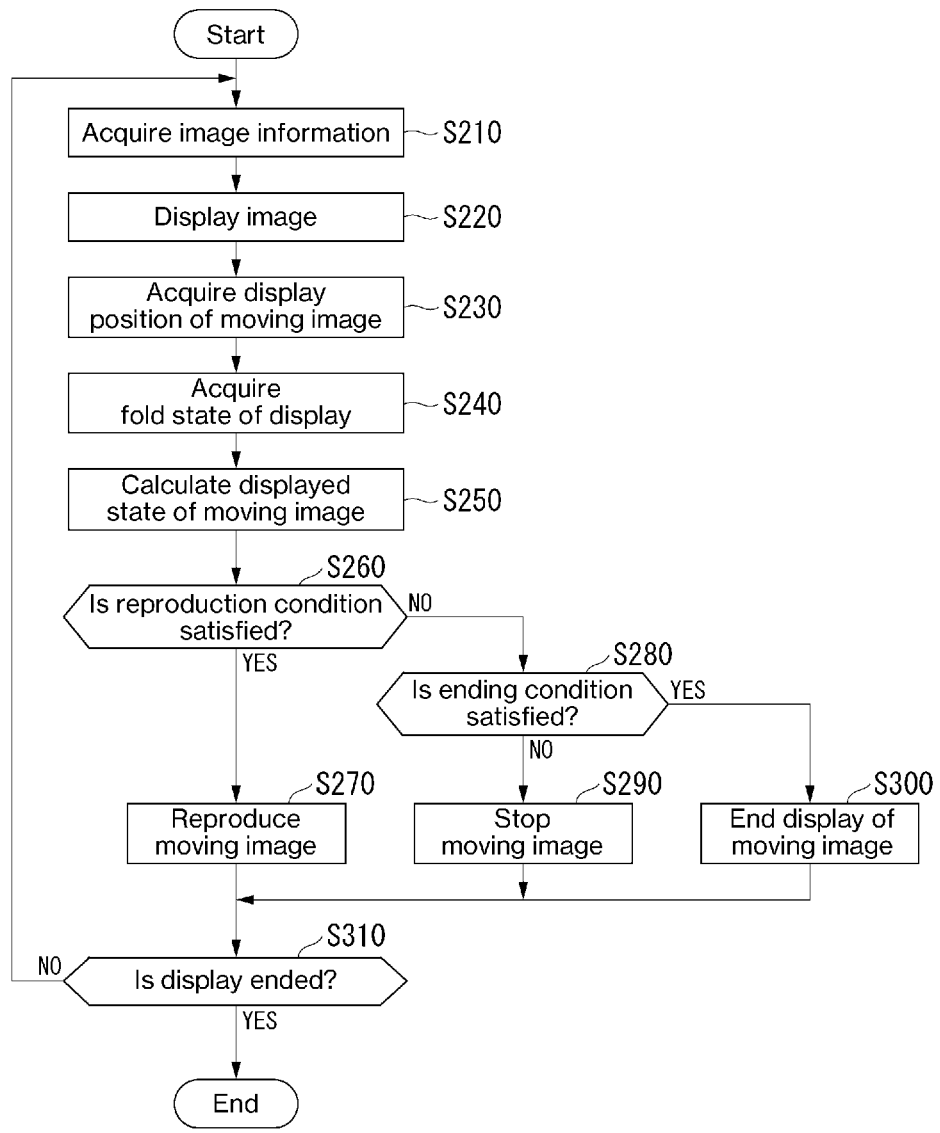
FIG. 14 is a diagram showing an example of operations of the controller of the terminal of the present embodiment.

FIG. 14 shows an example of the operations of the controller 21 included in the terminal 20 of the present embodiment.

Operation S210: The moving image information acquisition unit 211 of the controller 21 acquires image information IM from the server 10. As described above, the image information IM includes information of images that constitute the moving image ARV and information that indicates a display size or a display area, such as the number of pixels, of the moving image ARV in the display DP.

Operation S220: The display controller 216 displays an image in the display DP based on the image information IM acquired by the moving image information acquisition unit 211. If the image that is displayed includes a moving image ARV, the display controller 216 outputs, to the moving image information acquisition unit 211, moving image position information DV indicating the display position of the moving image ARV in the display DP.

Operation S230: The moving image information acquisition unit 211 acquires the moving image position information DV from the display controller 216. The moving image position information DV indicates the position in the display DP at which the moving image ARV is displayed. More specifically, the moving image information acquisition unit 211 acquires moving-image reference position information LC indicating the display position of the moving image ARV, as the moving image position information DV.

Operation S240: The folding information acquisition unit 212 acquires a position between the upper display DPU and the lower display DPL, i.e., the position of the fold portion FL of the display DP. The folding information acquisition unit 212 outputs the acquired position of the fold portion FL as fold state information DF to the display state calculation unit 213.

Operation S250: The display state calculation unit 213 calculates a displayed state of the moving image ARV based on the moving image position information DV and the fold state information DF. More specifically, the display state calculation unit 213 calculates a relationship between the position of the moving image ARV displayed in the display DP and the position of the fold portion FL based on the moving image position information DV and the fold state information DF.

Operations S260 to S300: The display controller 216 determines whether or not any of a reproduction condition, a stop condition, and a reproduction ending condition of the moving image ARV is satisfied, and controls reproduction, stopping, or ending of reproduction of the moving image ARV.

More specifically, the display controller 216 determines whether or not any of the reproduction condition, the stop condition, and the reproduction ending condition of the moving image ARV is satisfied, based on the positional relationship between the moving image ARV and the fold portion FL calculated in operation S250. For example, if the moving image ARV is not positioned at the fold portion FL, the display controller 216 determines that the reproduction condition is satisfied, and reproduces the moving image ARV (operation S270). If the moving image ARV is positioned at the fold portion FL, the display controller 216 determines that the stop condition of the moving image is satisfied, and stops the moving image ARV (operation S290).

Note that the display controller 216 may optionally end reproduction of the moving image ARV when the display DP is in a predetermined fold state. For example, there is a case where the fold angle θ has been acquired in operation S240. In this case, if the fold angle θ is not greater than a threshold angle or smaller than the threshold angle, the display controller 216 ends reproduction of the moving image ARV (operation S300).

Operation S310: The display controller 216 repeatedly executes operations S210 to S300 until an image display ending condition is satisfied (e.g., until an operation for ending display is performed by the user U).

That is, the moving image information acquisition unit 211 of the present embodiment acquires the moving image position information DV relating to the position in the display DP at which the moving image ARV is displayed.

The folding information acquisition unit 212 acquires the fold position information DFL relating to the position of the fold portion FL of the display DP.

The display controller 216 controls the moving image ARV displayed in the display DP based on the moving image position information DV and the fold position information DFL.

If the display position of the moving image ARV indicated by the moving image position information DV and the position of the fold portion FL indicated by the fold position information DFL are at the distance L1 from each other (a first positional relationship), the display controller 216 determines that the stop condition is satisfied, and performs control to stop the moving image ARV. If the display position of the moving image ARV indicated by the moving image position information DV and the position of the fold portion FL indicated by the fold position information DFL are spaced farther apart from each other than in the first positional relationship and are at the distance L2 from each other (a second positional relationship), the display controller 216 determines that the reproduction condition is satisfied, and performs control to reproduce the moving image ARV.

That is, the display controller 216 stops the moving image ARV when the moving image ARV is displayed at the position of the fold portion FL, and reproduces the moving image ARV when the moving image ARV is displayed at the position of a non-fold portion NFL.

Here, the display controller 216 controls the stopping and the reproduction of the moving image ARV based on a positional relationship between the display position of the moving image ARV indicated by the moving image position information DV and the position of the fold portion FL indicated by the fold position information DFL.

Variation (1) of Second Embodiment

A case is described above as an example in which the moving-image reference position information LC is information indicating the upper end of the display position of the moving image ARV, but there is no limitation to such a case. The moving-image reference position information LC only needs to move as the display position of the moving image ARV moves due to a scroll operation, and may be set at a position that is spaced apart from the display position of the moving image ARV.

Figure 15:
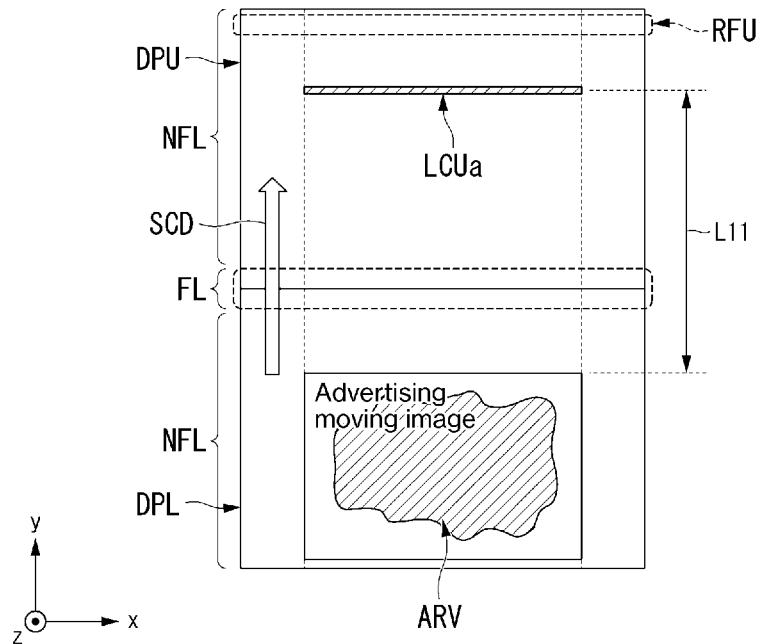
FIG. 15 is a diagram showing a third example of the positional relationship between the display position of the moving image and the position of the fold portion in the present embodiment.

FIG. 15 shows a third example of the positional relationship between the display position of the moving image ARV and the position of the fold portion FL in the present embodiment. In the illustrated example, upper moving-image reference position information LCUa is set at a position that is spaced apart from the position of the upper end of the moving image ARV by a distance L11. The position of the upper moving-image reference position information LCUa moves as the display position of the moving image ARV moves due to a scroll operation.

Figure 16:
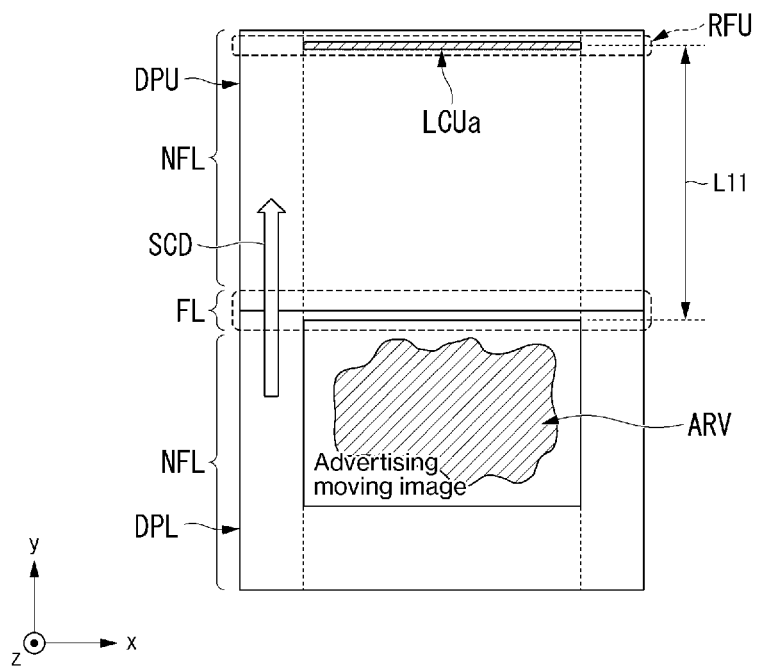
FIG. 16 is a diagram showing a fourth example of the positional relationship between the display position of the moving image and the position of the fold portion in the present embodiment.

FIG. 16 shows a fourth example of the positional relationship between the display position of the moving image ARV and the position of the fold portion FL in the present embodiment. When the display position of the moving image ARV moves upward (in the positive direction of the y axis) due to a scroll operation, the position of the upper moving-image reference position information LCUa also moves upward. Here, when the upper end of the moving image ARV overlaps the fold portion FL, the position of the upper moving-image reference position information LCUa overlaps a position that is indicated by upper folding reference position information RFU (e.g., the upper end of the upper display DPU). That is, the upper moving-image reference position information LCUa having moved to a position that overlaps the upper folding reference position information RFU means that the moving image ARV is displayed at the fold portion FL.

Here, the upper moving-image reference position information LCUa is information that serves as a reference for the position at which the moving image ARV is displayed, and differs from the position in the display DP at which the moving image ARV is displayed. The upper moving-image reference position information LCUa is included in the moving image position information DV described above. Also, the upper folding reference position information RFU is information that serves as a reference for the fold portion FL (fold position), and differs from the position of the fold portion FL (fold portion FL (fold position)) in the display DP. The upper folding reference position information RFU is included in the fold position information DFL described above.

In this example, the display controller 216 controls the moving image ARV displayed in the display DP based on the moving-image reference position information LC and the upper folding reference position information RFU.

More specifically, the moving-image reference position information LC is set such that the moving-image reference position information LC and folding reference position information RF (e.g., the upper folding reference position information RFU) are within a set range when the position of the fold portion FL in the display DP and the position of the moving image ARV in the display DP are within a set range. If the moving-image reference position information LC and the folding reference position information RF (e.g., the upper folding reference position information RFU) are within the set range (e.g., a predetermined width in the y axis direction), the display controller 216 determines that the stop condition is satisfied, and performs control to stop the moving image ARV. On the other hand, if the moving-image reference position information LC and the folding reference position information RF (e.g., the upper folding reference position information RFU) are not within the set range (e.g., the predetermined width in the y axis direction), the display controller 216 determines that the reproduction condition is satisfied, and performs control to reproduce the moving image ARV.

Note that when the display scale of the moving image ARV in the display DP is changed, a distance L between the moving image ARV and the moving-image reference position information LC may optionally be changed according to the display scale.

Figure 17A:
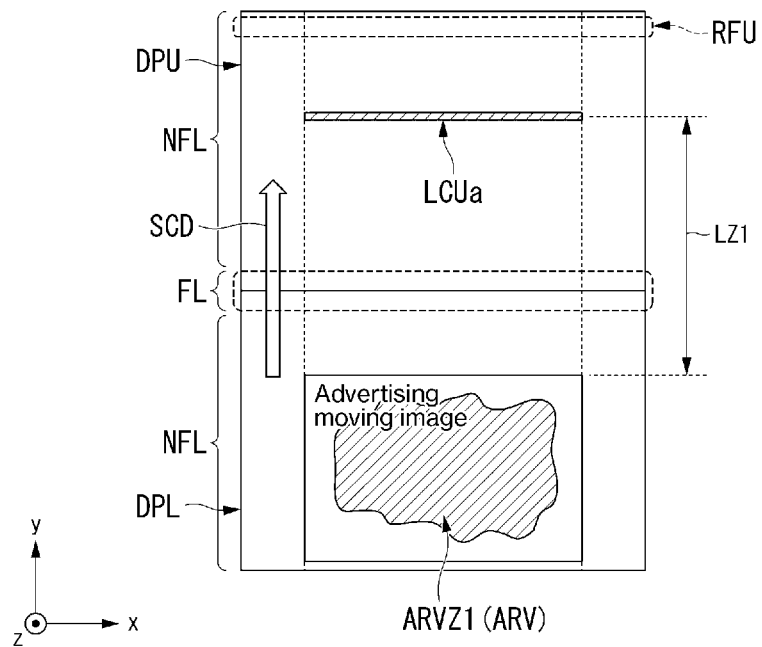
FIGS. 17A and 17B are diagrams showing examples of the moving image displayed in respective display scales in the display of the present embodiment.
Figure 17B:
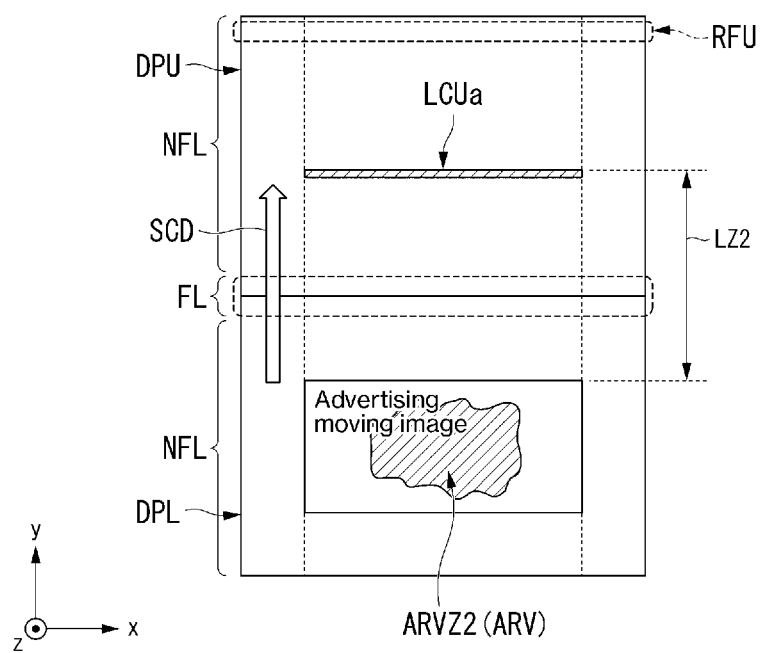

FIGS. 17A and 17B show examples of the moving image ARV displayed in respective display scales in the display DP of the present embodiment. FIG. 17A shows an example of the moving image ARV in the present embodiment in a case where the display scale is relatively large. FIG. 17B shows an example of the moving image ARV in the present embodiment in a case where the display scale is relatively small.

As shown in FIG. 17A, when the display scale of the moving image ARV is relatively large (i.e., when a moving image ARVZ1 is displayed), the display controller 216 sets a distance between the moving image ARVZ1 and the upper moving-image reference position information LCUa to a distance LZ1.

As shown in FIG. 17B, when the display scale of the moving image ARV is relatively small (i.e., when a moving image ARVZ2 is displayed), the display controller 216 sets a distance between the moving image ARVZ2 and the upper moving-image reference position information LCUa to a distance LZ2. Here, the distance LZ2 is shorter than the distance LZ1. That is, the display controller 216 changes the distance L between the moving image ARV and the moving-image reference position information LC according to the display scale of the moving image ARV.

That is, the display controller 216 performs control to stop and reproduce the moving image ARV based on moving-image reference position information LC for which the positional relationship between the position of the moving image ARV and the position based on the moving-image reference position information LC in the display DP has been changed based on the display scale of the image displayed in the display DP.

A case where the moving-image reference position information LC is set on the upper side (in the positive direction of the y axis) of the moving image ARV has been described above, but there is no limitation to such a case.

Figure 18:
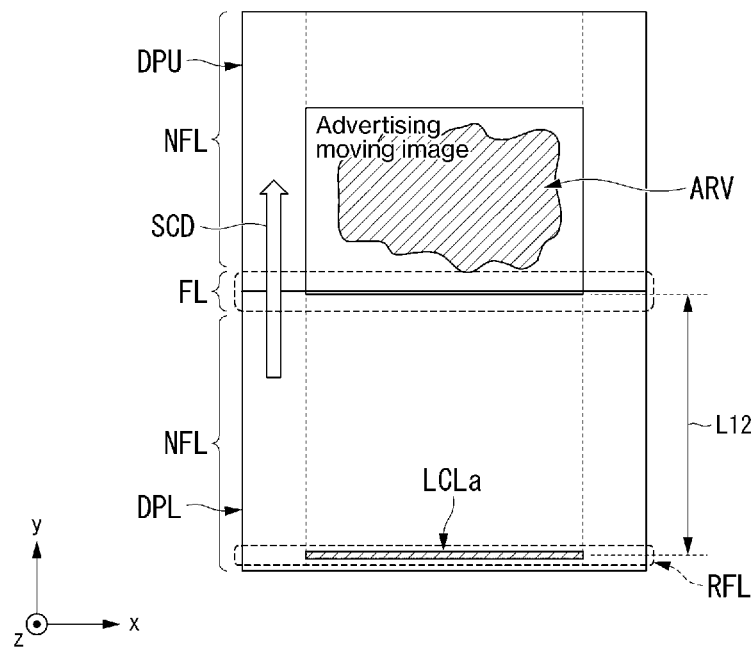
FIG. 18 is a diagram showing a fifth example of the positional relationship between the display position of the moving image and the position of the fold portion in the present embodiment.

FIG. 18 shows a fifth example of the positional relationship between the display position of the moving image ARV and the position of the fold portion FL in the present embodiment.

Figure 19:
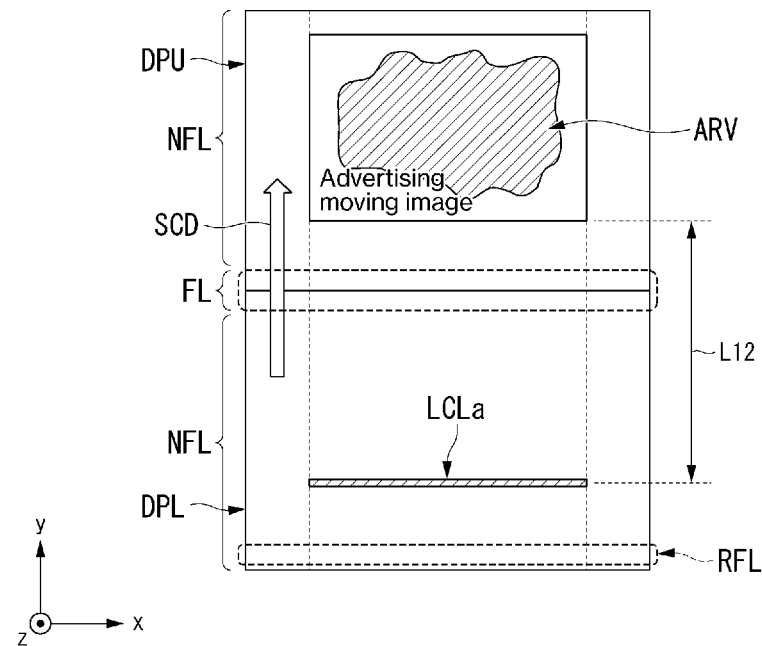
FIG. 19 is a diagram showing a sixth example of the positional relationship between the display position of the moving image and the position of the fold portion in the present embodiment.

FIG. 19 shows a sixth example of the positional relationship between the display position of the moving image ARV and the position of the fold portion FL in the present embodiment.

As shown in these drawings, the moving-image reference position information LC may optionally be set on the lower side (in the negative direction of the y axis) of the moving image ARV. As shown in FIG. 18, lower moving-image reference position information LCLa is set at a position that is spaced apart from the lower end of the display position of the moving image ARV by a distance L12. The distance L12 is set such that when the lower moving-image reference position information LCLa overlaps lower folding reference position information RFL, the display position of the moving image ARV overlaps the fold portion FL. When the lower moving-image reference position information LCLa overlaps the lower folding reference position information RFL, the display controller 216 stops the moving image ARV. Also, when the display position of the moving image ARV has moved upward (in the positive direction of the y axis) due to a scroll operation and the lower moving-image reference position information LCLa no longer overlaps the lower folding reference position information RFL, the display controller 216 reproduces the moving image ARV.

Note that there may be a case where the display position of the moving image ARV in the display DP can be changed by the user U. In this case, the position indicated by the moving-image reference position information LC may be optionally changed as the display position of the moving image ARV is changed.

That is, the position of the moving-image reference position information LC in the display DP can be changed as the position of the moving image ARV is changed by an input made on the terminal 20 by the user U.

Variation (2) of Second Embodiment

A case is described above as an example in which the stopping and the reproduction of the moving image ARV are controlled based on whether or not the display position of the moving image ARV overlaps the fold portion FL, but there is no limitation to such a case. When the display position of the moving image ARV overlaps the fold portion FL, the display controller 216 may move the display position of the moving image ARV. That is, controlling the moving image ARV includes not only controlling the stopping and the reproduction of the moving image ARV but also moving the display position of the moving image ARV.

Figure 20:
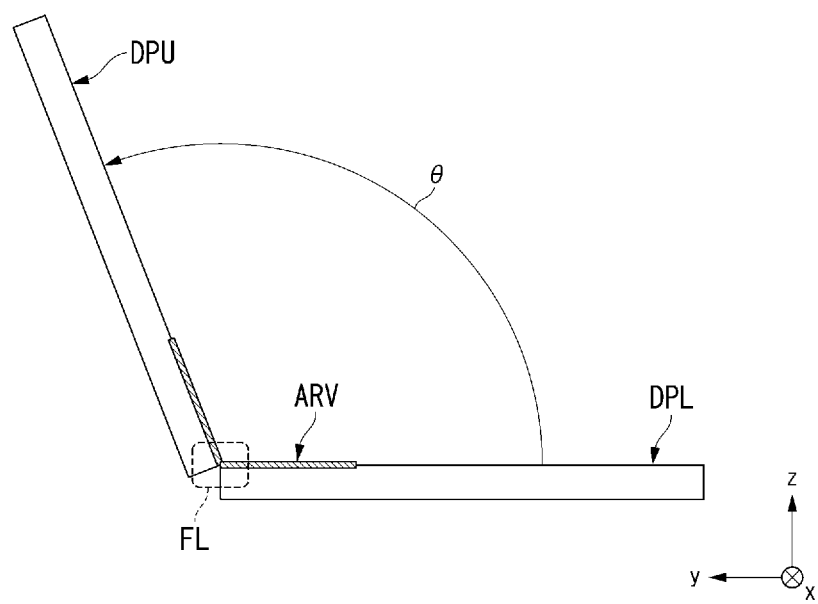
FIG. 20 is a diagram showing an example of a moving image before the display position is moved in the present embodiment.

FIG. 20 shows an example of the moving image ARV before the display position is moved in the present embodiment.

Figure 21:
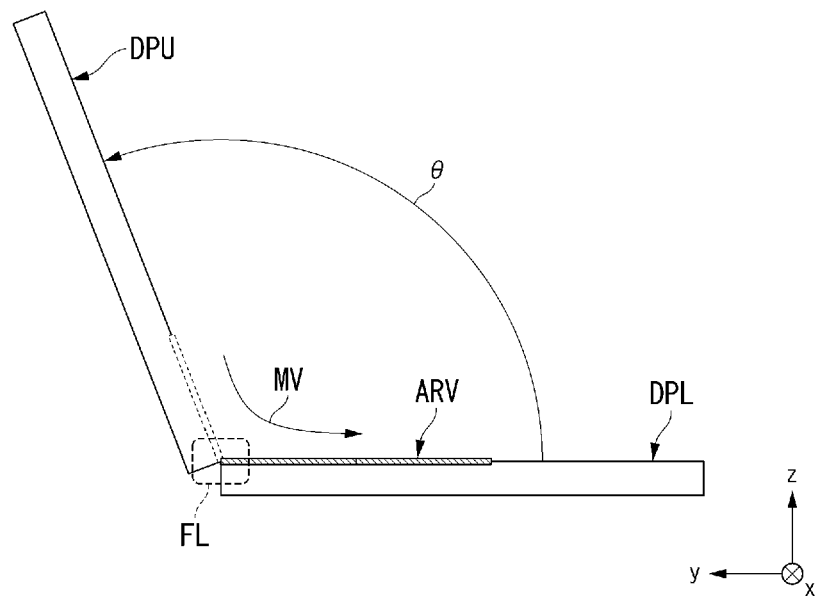
FIG. 21 is a diagram showing an example of the moving image after the display position is moved in the present embodiment.

FIG. 21 shows an example of the moving image ARV after the display position is moved in the present embodiment.

When it is determined that the display position of the moving image ARV overlaps the fold portion FL in the procedures described above, the display controller 216 may move the moving image ARV such that the display position of the moving image ARV does not overlap the fold portion FL. In the example shown in FIG. 21, the display controller 216 moves the display position of the moving image ARV downward (in the negative direction of the y axis).

That is, control performed by the display controller 216 for the moving image ARV includes control that is performed based on the display position of the moving image ARV and the position of the fold portion FL.

Also, control performed by the display controller 216 for the moving image ARV includes control that is performed to move the display position of the moving image ARV when the display position overlaps the fold portion FL.

Also, the display controller 216 may move the display position of the moving image ARV when the fold angle θ of the display DP is changed.

Figure 22:
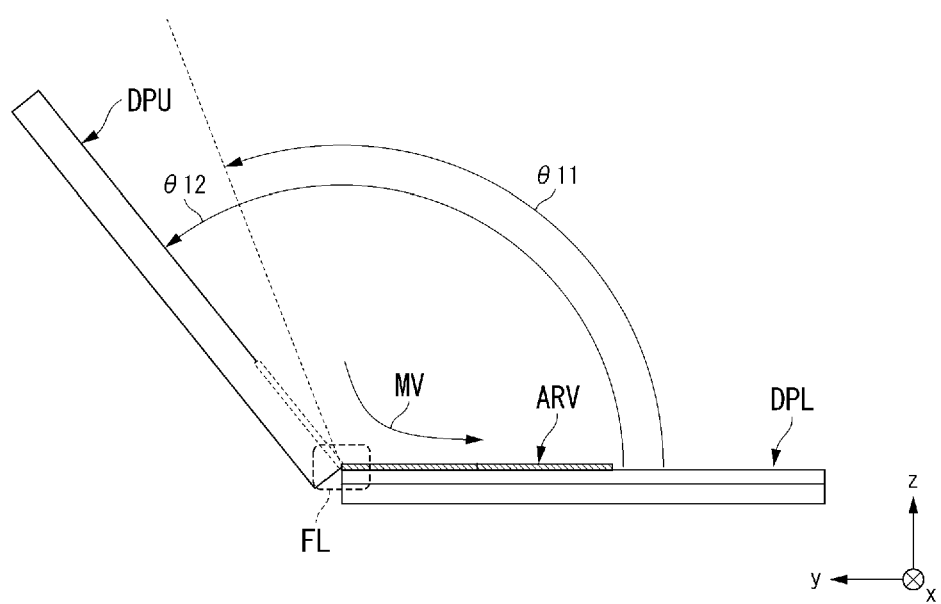
FIG. 22 is a diagram showing an example of movement of the display position of the moving image in the present embodiment.

FIG. 22 shows an example of movement of the display position of the moving image ARV in the present embodiment. In an example, the display controller 216 acquires the fold angle θ included in the fold state information DF. When the acquired fold angle θ has changed from a fold angle θ11 to a fold angle θ12, the display controller 216 moves the display position of the moving image ARV.

That is, if the display position of the moving image ARV overlaps the fold portion FL, the display controller 216 moves the display position of the moving image ARV to a region that is different from the fold portion FL.

Also, controlling the moving image ARV may optionally mean a combination of controlling the stopping and the reproduction of the moving image ARV and moving the display position of the moving image ARV.

For example, the display controller 216 may optionally be configured to stop the moving image ARV when the display position of the moving image ARV overlaps the fold portion FL, and reproduce the moving image ARV when the display position of the moving image ARV has been moved to a region that is different from the fold portion FL.

More specifically, when the user U opens the display DP (e.g., the fold angle θ changes from the fold angle θ11 to the fold angle θ12) in a case where the moving image ARV is positioned at the fold portion FL as shown in FIG. 22, it appears for the user U as if the display position of the moving image ARV moves downward (e.g., in the negative direction of the y axis) in the display DP. That is, the apparent position of the moving image ARV moves downward (e.g., in the negative direction of the y axis) when the display DP is opened. The display controller 216 moves the display position of the moving image ARV so as to suppress movement of the apparent position of the moving image ARV. For example, the display controller 216 moves the display position of the moving image ARV downward (e.g., in the negative direction of the y axis) in the display DP such that the moving image ARV is displayed without overlapping the fold portion FL.

Note that the display controller 216 may move the display position of the moving image ARV in a direction opposite to the above-described direction (i.e., upward (e.g., the positive direction of the y axis) in the display DP) when the fold angle θ has changed as a result of the display DP being opened. That is, the display controller 216 moves the display position of the moving image ARV upward (e.g., in the positive direction of the y axis) in the display DP such that the moving image ARV is displayed without overlapping the fold portion FL.

Variation (3) of Second Embodiment

The following configuration may optionally be adopted regarding movement of the display position of the moving image ARV.

Figure 23:
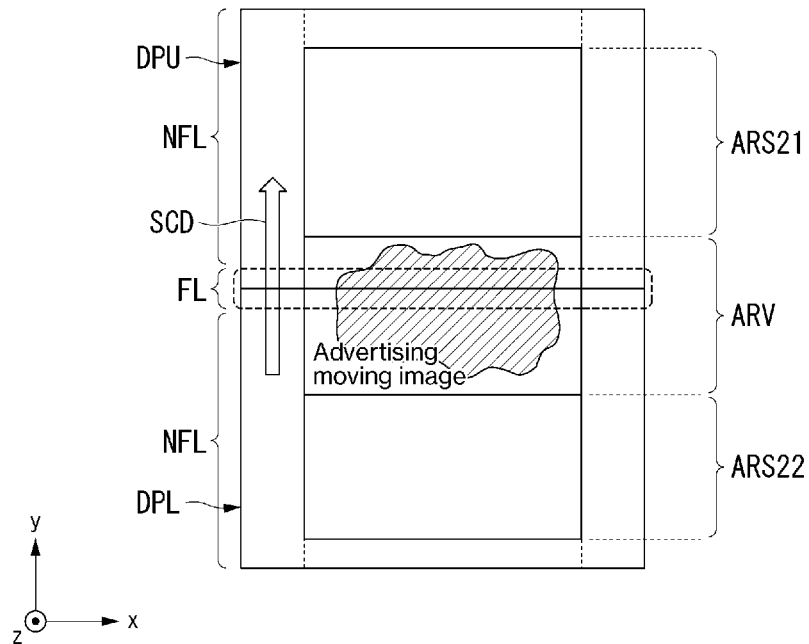
FIG. 23 is a diagram showing an example of the display position of a moving image before display positions are interchanged in the present embodiment.

FIG. 23 shows an example of the display position of the moving image ARV before display positions are interchanged in the present embodiment.

Figure 24:
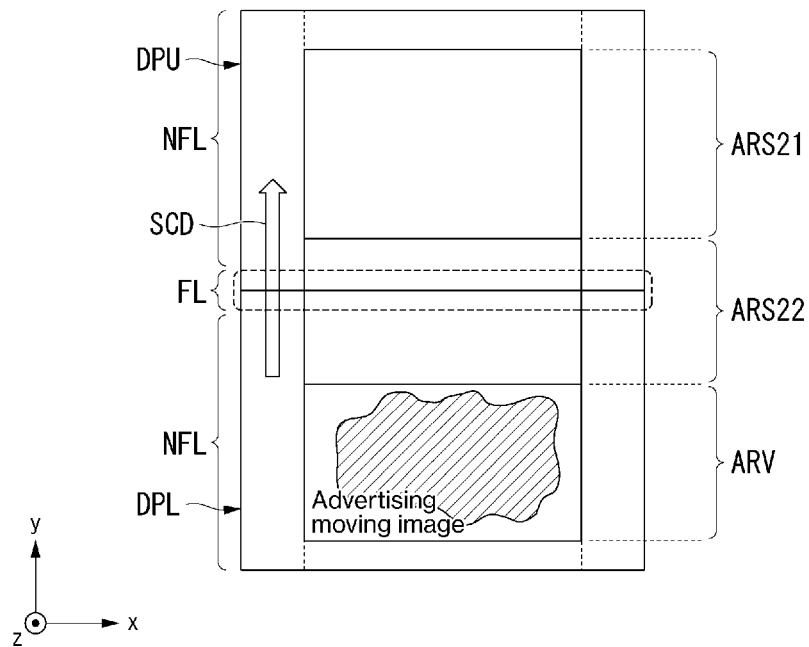
FIG. 24 is a diagram showing an example of the display position of the moving image after display positions are interchanged in the present embodiment.

FIG. 24 shows an example of the display position of the moving image ARV after the display positions are interchanged in the present embodiment.

As described above, images displayed in the display DP include moving images ARV and still images ARS. As shown in FIG. 23, there is a case where the display position of a moving image ARV overlaps the fold portion FL and display positions of still images ARS (e.g., still images ARS21 and ARS22) do not overlap the fold portion FL. In this case, the display controller 216 displays the moving image ARV and the still images ARS by interchanging the display position of the moving image ARV and the display position of any of the still images ARS (e.g., the still image ARS22) as shown in FIG. 24.

Note that the still images ARS may be images of text such as online articles, images of photographs, or images of any other form.

That is, information displayed in the display DP includes first information that includes a moving image ARV and second information that does not include the moving image ARV. Control performed by the display controller 216 for the moving image ARV includes control that is performed to interchange the display position of the first information and the display position of the second information when the display position of the first information overlaps the fold portion FL and the display position of the second information is included in a region different from the fold portion FL.

Effects of Second Embodiment

If an image is displayed at the fold portion FL when displaying images in the foldable display DP, the visibility of the image from the user U is lower than images that are displayed at other portions. In a case where the displayed image is an advertising moving image, for example, a viewing rate of the advertisement displayed at the fold portion FL is lower than cases of being displayed at other portions, and it has been difficult to improve advertisement effects.

The display device D of the present embodiment controls the stopping and the reproduction of the moving image ARV displayed in the display DP based on the display position of the moving image ARV and the position of the fold portion FL of the display DP. More specifically, when the moving image ARV is displayed at the fold portion FL, the display device D of the present embodiment stops the moving image ARV. Also, when the display position of the moving image ARV has passed the fold portion FL and the moving image ARV is displayed at a non-fold portion NFL, the display device D of the present embodiment reproduces the moving image ARV.

With the display device D configured as described above, it is possible to stop and reproduce the moving image ARV based on how the moving image ARV appears for the user U. For example, the display device D reproduces the moving image ARV when the moving image ARV can be clearly seen from the user U and stops the moving image ARV when the moving image ARV cannot be clearly seen from the user U. Therefore, with the display device D of the present embodiment, it is possible to control the stopping and the reproduction of the moving image ARV based on visibility of the moving image ARV from the user U.

Also, the display device D of the present embodiment controls the stopping and the reproduction of the moving image ARV based on the display position of the moving image ARV and the position of the fold portion FL. Therefore, according to the display device D of the present embodiment, it is possible to control the stopping and the reproduction of the moving image ARV based on whether or not the moving image ARV is positioned at the fold portion FL.

Also, the display device D of the present embodiment controls the stopping and the reproduction of the moving image ARV based on a positional relationship (e.g., a distance) between the display position of the moving image ARV and the position of the fold portion FL. Therefore, according to the display device D of the present embodiment, it is possible to perform control so as to stop the moving image ARV when the moving image ARV is close to the fold portion FL and reproduce the moving image ARV when the moving image ARV is far from the fold portion FL, for example.

Also, the display device D of the present embodiment controls the stopping and the reproduction of the moving image ARV based on a positional relationship (e.g., a distance) between reference position information that indicates the display position of the moving image ARV and reference position information that indicates the position of the fold portion FL. Therefore, according to the display device D of the present embodiment, even when the position at which the moving image ARV is actually displayed cannot be determined, it is possible to determine the positional relationship between the moving image ARV and the fold portion FL by acquiring the reference position information. The display device D configured as described above makes it possible to eliminate the labor of embedding display position information in the moving image ARV, for example, and to more easily determine the positional relationship between the moving image ARV and the fold portion FL.

Also, the display device D of the present embodiment changes a positional relationship (e.g., a distance) between the display position of the moving image ARV and the reference position information indicating the display position of the moving image ARV based on a display scale of the moving image ARV. The display device D configured as described above makes it possible to eliminate the labor of setting positional relationships for individual display scales in preparation for a change in the display scale of the moving image ARV, for example, and to more easily determine the positional relationship between the moving image ARV and the fold portion FL.

Also, when the fold portion FL and the display position of the moving image ARV are within a set range, the display device D of the present embodiment controls the stopping and the reproduction of the moving image ARV based on a positional relationship (e.g., a distance) between first reference position information that indicates the display position of the moving image ARV and second reference position information that indicates the position of the fold portion FL. Therefore, according to the display device D of the present embodiment, even when the position at which the moving image ARV is actually displayed cannot be directly determined or the position of the fold portion FL cannot be directly determined, it is possible to determine the positional relationship between the moving image ARV and the fold portion FL by acquiring the first reference position information and the second reference position information. The display device D configured as described above makes it possible to eliminate the labor of embedding display position information in the moving image ARV, for example, and to more easily determine the positional relationship between the moving image ARV and the fold portion FL.

Also, the display device D of the present embodiment changes the first reference position information indicating the display position of the moving image ARV when the display position of the moving image ARV is changed as a result of an operation being performed by the user U. Therefore, according to the display device D of the present embodiment, even when the position at which the moving image ARV is actually displayed cannot be directly determined in a case where the user U has performed a scroll operation, for example, it is possible to determine the positional relationship between the moving image ARV and the fold portion FL by acquiring the reference position information. The display device D configured as described above makes it possible to eliminate the labor of embedding display position information in the moving image ARV in preparation for an operation that is performed by the user U to change the display position, for example, and to more easily determine the positional relationship between the moving image ARV and the fold portion FL.

Stopping the moving image ARV in the display device D of the present embodiment means continuously displaying a frame image among the plurality of frame images constituting the moving image (e.g., entering a pause state or stop motion). According to the display device D configured as described above, when the display device has entered a state where the moving image ARV can be reproduced, the reproduction can be started from an intermediate frame at which the reproduction was stopped, rather than the first frame of the moving image ARV, and effects of presenting the moving image ARV can be enhanced. Also, according to the display device D configured as described above, a reproduction time can be reduced when compared to a case where the moving image ARV is reproduced from the beginning, and therefore, it is possible to reduce consumption of resources such as power and a memory for reproducing the moving image ARV.

Also, the display device D of the present embodiment controls the stopping and the reproduction of the moving image ARV based on a positional relationship between the display position of the moving image ARV and a folded region that is based on the position of the fold portion FL. According to the display device D configured as described above, the stopping and the reproduction of the moving image ARV are controlled based on whether or not the moving image ARV is positioned at the fold portion FL at which visibility of the moving image ARV from the user U is low, and accordingly, the moving image ARV can be reproduced in a state where visibility of the moving image ARV is high. Therefore, the display device D can enhance effects of presenting the moving image ARV.

Also, the display device D of the present embodiment moves the display position of the moving image ARV when the display position of the moving image ARV is at the fold portion FL. According to the display device D configured as described above, when the moving image ARV is positioned at the fold portion FL at which visibility of the moving image ARV from the user U is low, the display position of the moving image ARV can be moved even if no operation is performed by the user U. Therefore, the display device D can reduce the number of operations that need to be performed by the user U.

Also, the display device D of the present embodiment moves the display position of the moving image ARV if the fold angle θ is changed when the display position of the moving image ARV is at the fold portion FL. According to the display device D configured as described above, when the moving image ARV is displayed at a position at which visibility of the moving image ARV from the user U is low, the display position of the moving image ARV can be moved even if no operation is performed by the user U. Therefore, the display device D can reduce the number of operations that need to be performed by the user U.

Also, the display device D of the present embodiment moves the display position of the moving image ARV to a region different from the fold portion FL when the display position of the moving image ARV is at the fold portion FL. According to the display device D configured as described above, when the moving image ARV is positioned at the fold portion FL at which visibility of the moving image ARV from the user U is low, the display position of the moving image ARV can be moved to a position at which visibility of the moving image ARV is high. Therefore, the display device D can enhance effects of presenting the moving image ARV.

Also, the display device D of the present embodiment stops the moving image ARV when the display position of the moving image ARV is at the fold portion FL, and reproduces the moving image ARV when the display position of the moving image ARV has been moved to a position different from the fold portion FL. According to the display device D configured as described above, when the display position of the moving image ARV is moved, the stopping and the reproduction of the moving image ARV can be controlled even if no operation is performed by the user U. Therefore, the display device D can reduce the number of operations that need to be performed by the user U.

Also, the display device D of the present embodiment interchanges the display position of the moving image ARV and a display position of a still image ARS when the display position of the moving image ARV overlaps the fold portion FL and the display position of the still image ARS is included in a region different from the fold portion FL. Here, visibility of the moving image ARV is likely to decrease if the moving image ARV is displayed at the fold portion FL. Visibility of the still image ARS is less likely to decrease even if the still image ARS is displayed at the fold portion FL. According to the display device D configured as described above, it is possible to suppress a reduction in the visibility of the moving image ARV while effectively using the display area of the display DP by displaying the still image ARS at the fold portion FL and displaying the moving image ARV at a region other than the fold portion FL.

Also, the display device D of the present embodiment moves the display position of the moving image ARV to a position at which visibility for the user U is relatively high, based on the fold angle θ of the display DP. Therefore, according to the display device D of the present embodiment, even when visibility of the image from the user U may vary due to the fold angle θ of the display DP being changed while the moving image ARV is displayed, it is possible to suppress a change in visibility for the user U.

Also, the display device D of the present embodiment moves the display position of the moving image ARV by interchanging the display position of the moving image ARV and a display position of an image (e.g., a still image ARS) other than the moving image ARV based on a change in visibility of the moving image ARV from the user U. Commonly, if the position of an image that is displayed in the display DP is changed without intent of the user U, the user U may feel that something is wrong. The display device D of the present embodiment changes the display position of the moving image ARV by interchanging the display position of the moving image ARV and the display position of another image, and therefore, it is possible to suppress a change in the appearance of the whole image and provide a more intuitive interface for the user U.

Also, the display device D of the present embodiment determines a relationship between the display position of the moving image ARV and the position of the fold portion FL by taking a position (moving-image reference position information LC) other than the display position of the moving image ARV to be a reference position for controlling the moving image ARV. Therefore, according to the display device D of the present embodiment, the reference position can be set at a suitable position in the image, and the freedom in arranging the image and the reference position can be increased when compared to a case where the reference position needs to be set in the moving image ARV. In the display device D of the present embodiment, the moving-image reference position information LC may be set so as not to be displayed in the display DP. According to the display device D configured as described above, control of the moving image ARV can be performed without being noticed by the user U.

Also, the display device D of the present embodiment moves the display position of the moving image ARV based on the fold angle θ of the display DP. Commonly, it is difficult to calculate the degree of visibility of the moving image ARV from the user U, but according to the display device D configured as described above, the fold angle θ of the display DP is acquired instead of the degree of visibility of the moving image ARV, and therefore, it is possible to control the stopping and the reproduction of the moving image ARV with a relatively simple configuration.

Also, the display device D of the present embodiment controls the stopping and the reproduction of the moving image ARV according to a change in the fold angle θ of the display DP. Therefore, even when visibility for the user U varies due to the fold angle θ of the display DP being changed while the moving image ARV is displayed, it is possible to control the stopping and the reproduction of the moving image ARV according to the change in visibility for the user U.

Also, the display device D of the present embodiment controls the stopping and the reproduction of the moving image ARV based on a detection result of a line of sight of the user U or a position of the face of the user U, or an orientation of the display device D. According to the display device D configured as described above, even when visibility for the user U varies due to a change in positions of the display device D and the user U relative to each other, it is possible to control the stopping and the reproduction of the moving image ARV according to the change in visibility for the user U.

Also, the display device D of the present embodiment stops reproduction of the moving image ARV when the moving image ARV is displayed at a position that cannot be seen from the user U. Commonly, when a moving image ARV is reproduced, viewing effects of the moving image ARV (e.g., advertisement effects in a case where the moving image ARV is an advertising moving image) may decrease if the moving image ARV is reproduced to the end without being viewed by the user U. According to the display device D configured as described in the present embodiment, reproduction of the moving image ARV is stopped when visibility for the user U has decreased due to a change in positions of the display device D and the user U relative to each other, and therefore, it is possible to suppress a reduction in the viewing effects of the moving image ARV.

It should be noted that, although the embodiments of the present disclosure have been described based on the drawings and examples, it will be apparent to those skilled in the art that various changes and modifications could be made without deviating from the present disclosure. Accordingly, those changes and modifications are encompassed in the scope of the present disclosure. Functions and the like included in means, steps, operations, or the like can be rearranged such that no logical inconsistency arises, and a plurality of means, steps, operations, or the like can be combined into single means, step, operation, or the like, or single means, step, operation, or the like can be divided, without limitation thereto. Also, configurations shown in the embodiments may be combined as appropriate.

What is claimed is:

1. A moving image control method for controlling display of a moving image on a foldable display device, the foldable display device comprising an upper display, a lower display, and a fold portion between the upper display and the lower display, the moving image control method comprising:
   acquiring moving image position information indicating a position in a display region at which the moving image is displayed; and
   based on the moving image position information indicating that at least a portion of the moving image is displayed in the fold portion:
      acquiring fold state information indicating a fold state including a fold angle of the foldable display device;
      determining an apparent size of the moving image based on the fold angle included in the fold state information, the apparent size corresponding to a line segment that connects an upper end of the moving image and a lower end of the moving image and that is determined based on the fold angle included in the fold state information; and
      controlling whether the moving image is stopped or reproduced in the display region based on the moving image position information and the apparent size of the moving image;
   wherein the upper end of the moving image is in the upper display and the lower end of the moving image is in the lower display.

2. The moving image control method according to claim 1, wherein the controlling is performed based on the apparent size of the moving image that varies as the foldable display device is folded.

3. The moving image control method according to claim 2, wherein the moving image is stopped based on the apparent size of the moving image being less than or equal to a set size.

4. The moving image control method according to claim 2, wherein the apparent size of the moving image varies based on the position in the display region at which the moving image is displayed.

5. The moving image control method according to claim 4, wherein based on the display region being folded, the apparent size of the moving image changes based on the position in the display region at which the moving image is displayed.

6. The moving image control method according to claim 5, further comprising performing control to stop the moving image based on the fold angle being less than or equal to a first angle.

7. The moving image control method according to claim 6, further comprising performing control to reproduce the moving image based on the fold angle changing from less than or equal to the first angle to at least a second angle that is greater than the first angle.

8. The moving image control method according to claim 7, further comprising ending display of the moving image based on the fold angle being less than or equal to a third angle that is smaller than the first angle.

9. The moving image control method according to claim 8, wherein the controlling whether the moving image is stopped or reproduced is controlled based on a positional relationship between the position in the display region at which the moving image is displayed and a user of the foldable display device.

10. The moving image control method according to claim 1, wherein the controlling whether the moving image is stopped or reproduced is based on a direction of a line of sight of a user of the foldable display device or a positional relationship between the foldable display device and the user.

11. The moving image control method according to claim 1, wherein the controlling whether the moving image is stopped or reproduced is based on an orientation of the foldable display device.

12. The moving image control method according to claim 1, further comprising displaying a user interface element that relates to the moving image at a position that is different from a folded position of the display region.

13. The moving image control method according to claim 1, further comprising continuously displaying a frame image among a plurality of frame images that constitute the moving image while the moving image is stopped.

14. A non-transitory computer readable storage medium storing program instructions that are to be executed by a computer of a foldable display device to perform a moving image control method for controlling display of a moving image on the foldable display device, the foldable display device comprising an upper display, a lower display, and a fold portion between the upper display and the lower display, the moving image control method comprising:

acquiring moving image position information indicating a position in a display region at which the moving image is displayed; and based on the moving image position information indicating that at least a portion of the moving image is displayed in the fold portion:

acquiring fold state information indicating a fold state including a fold angle of the foldable display device;

determining an apparent size of the moving image based on the fold angle included in the fold state information, the apparent size corresponding to a line segment that connects an upper end of the moving image and a lower end of the moving image and that is determined based on the fold angle included in the fold state information; and controlling whether the moving image is stopped or reproduced in the display region based on the moving image position information and the apparent size of the moving image, wherein the upper end of the moving image is in the upper display and the lower end of the moving image is in the lower display.

15. A display device comprising:

a foldable display panel comprising an upper display, a lower display, and a fold portion between the upper display and the lower display;

a memory configured to store computer-readable instructions; and a processor configured to execute the computer-readable instructions to:

acquire moving image position information indicating a position in a display region at which the moving image is displayed on the foldable display panel; and based on the moving image position information indicating that at least a portion of the moving image is displayed in the fold portion:

acquire fold state information indicating a fold state including a fold angle of the foldable display panel;

determine an apparent size of the moving image based on the fold angle included in the fold state information, the apparent size corresponding to a line segment that connects an upper end of the moving image and a lower end of the moving image and that is determined based on the fold angle included in the fold state information; and control whether the moving image is stopped or reproduced in the display region based on the moving image position information and the apparent size of the moving image, wherein the upper end of the moving image is in the upper display and the lower end of the moving image is in the lower display.

* * * * *